Figure 1:
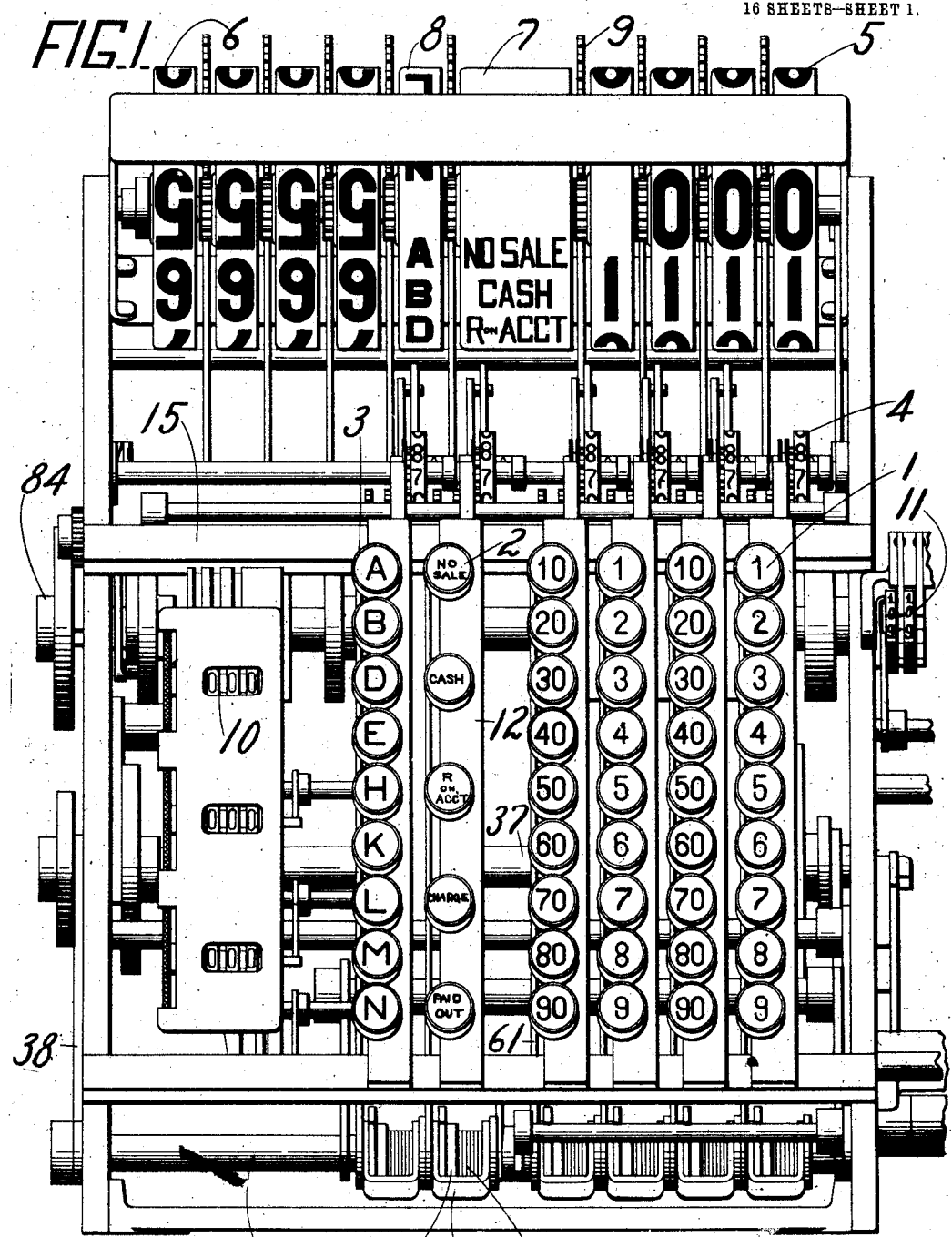

T. CARROLL.
CASH REGISTER.
APPLICATION FILED APR. 9, 1910.

1,054,672. Patented Mar. 4, 1913.
16 SHEETS—SHEET 1.

WITNESSES: G. W. Fairchild. Geo. S. Foerderer.

INVENTOR Thomas Carroll
BY [signature] and [signature]
ATTORNEYS

T. CARROLL.
CASH REGISTER.
APPLICATION FILED APR. 9, 1910.

1,054,672.

Patented Mar. 4, 1913.
16 SHEETS—SHEET 2.

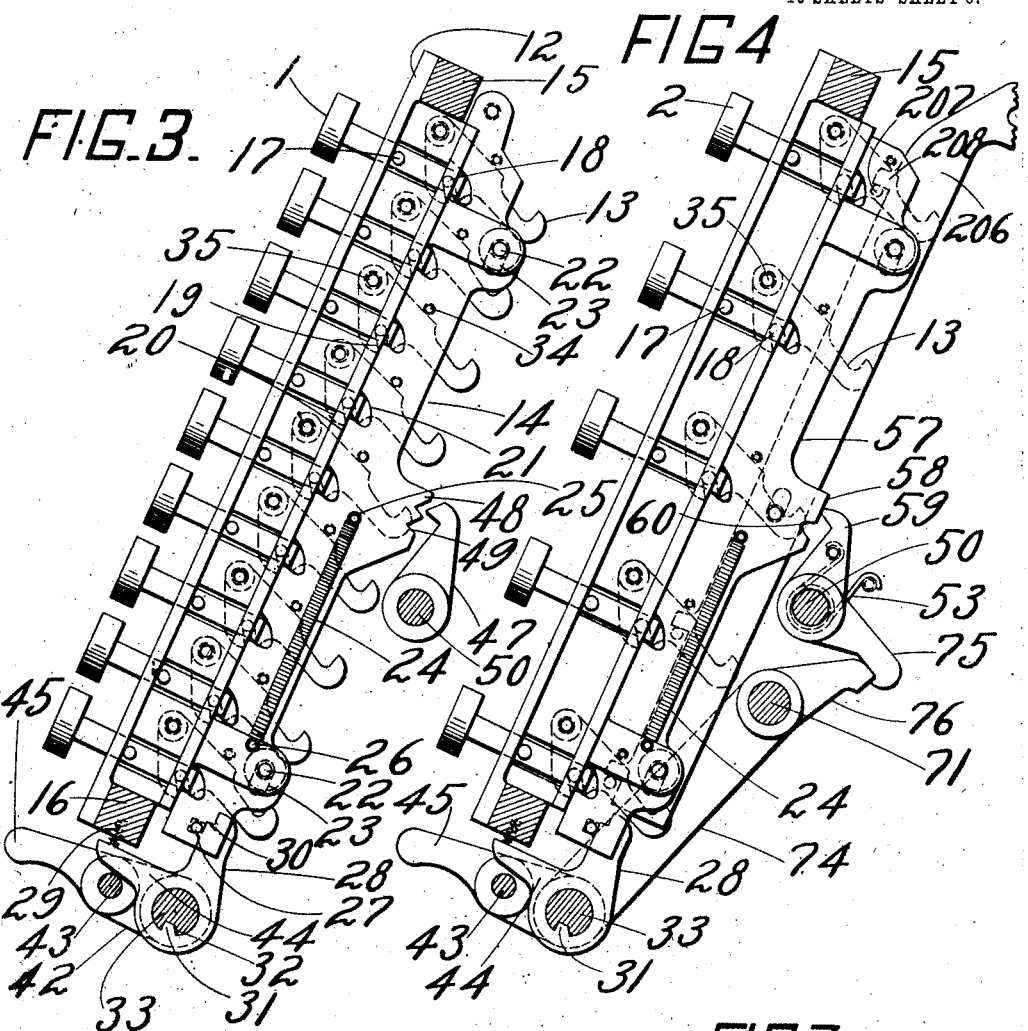

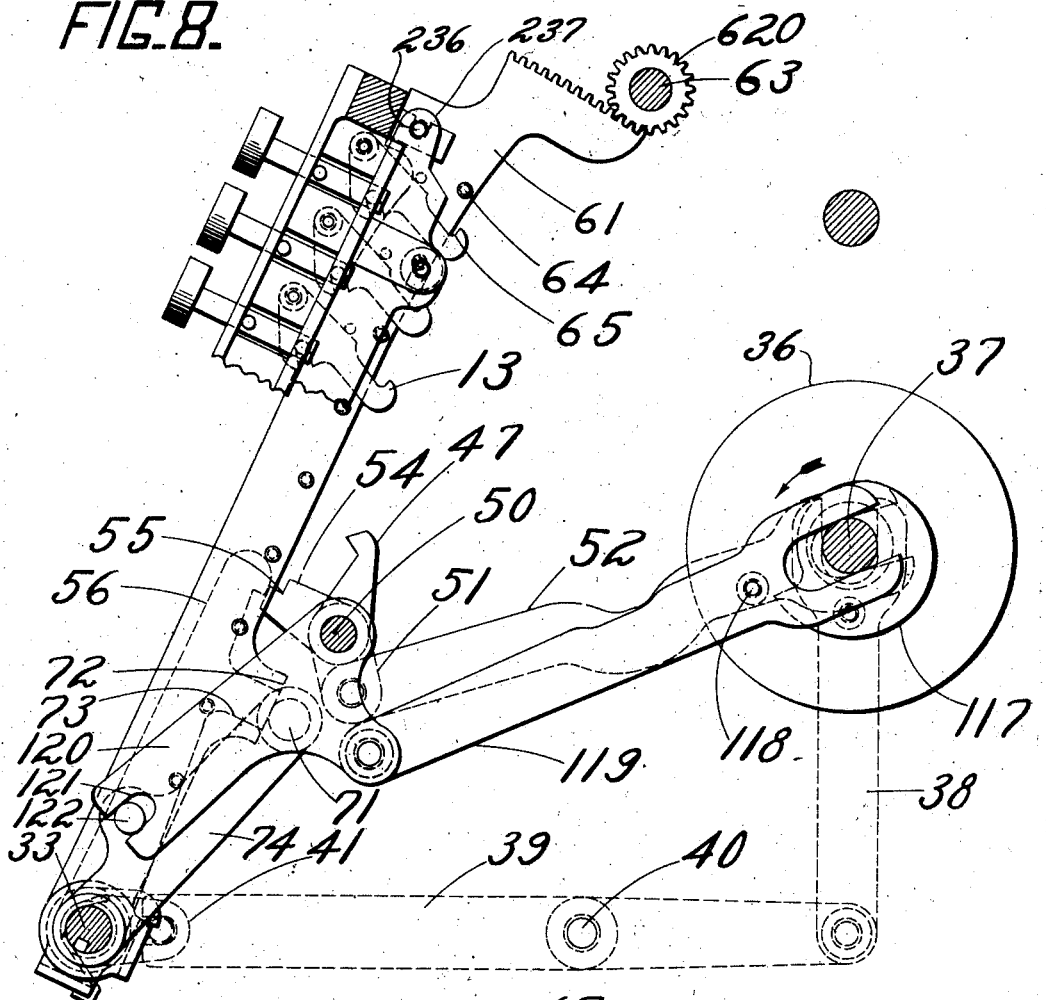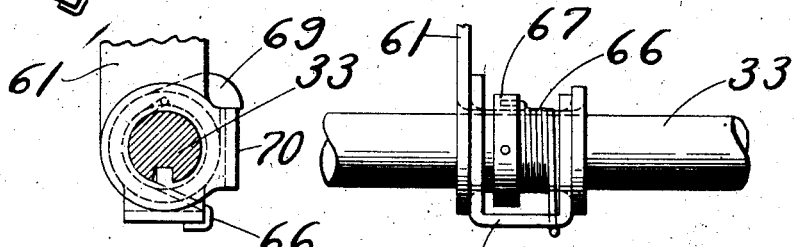

T. CARROLL.
CASH REGISTER.
APPLICATION FILED APR. 9, 1910.
1,054,672.
Patented Mar. 4, 1913.
16 SHEETS—SHEET 5.
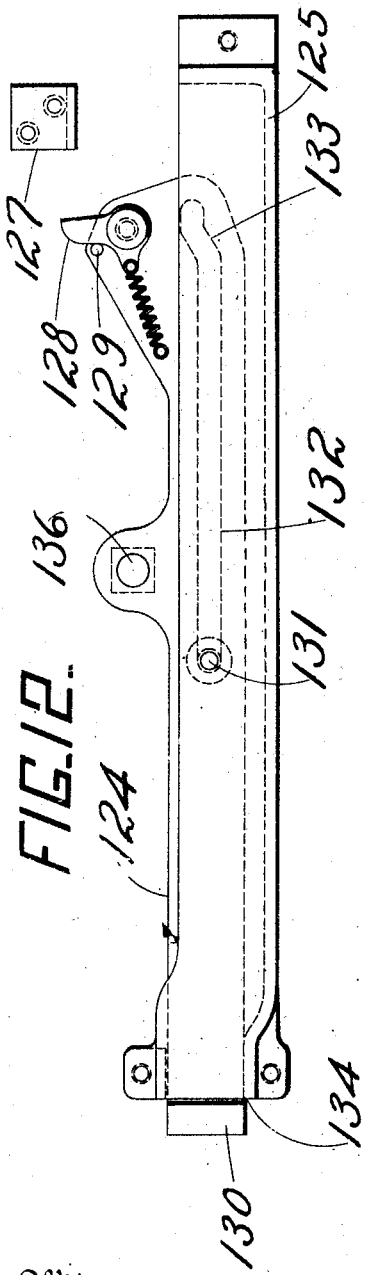
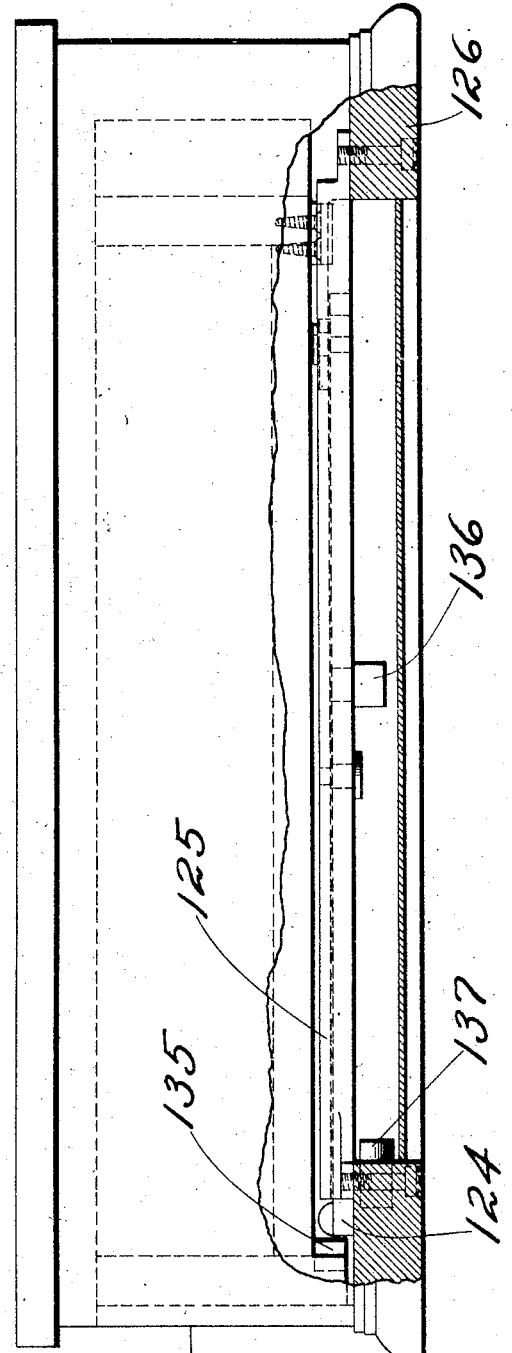

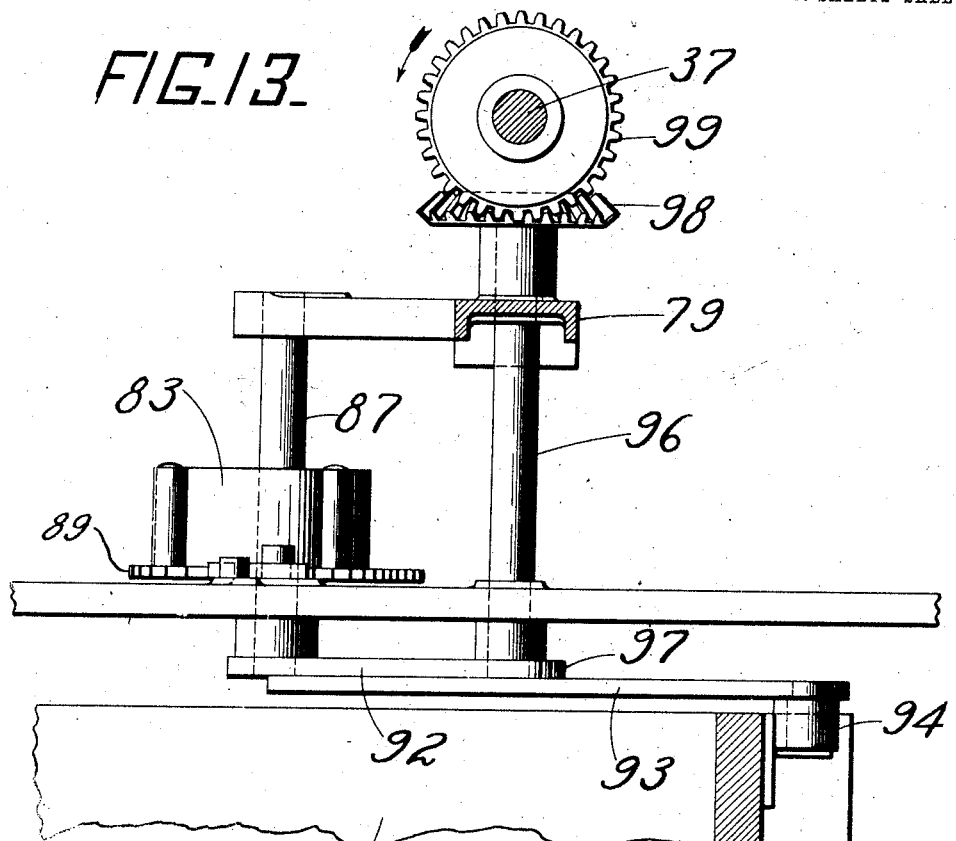
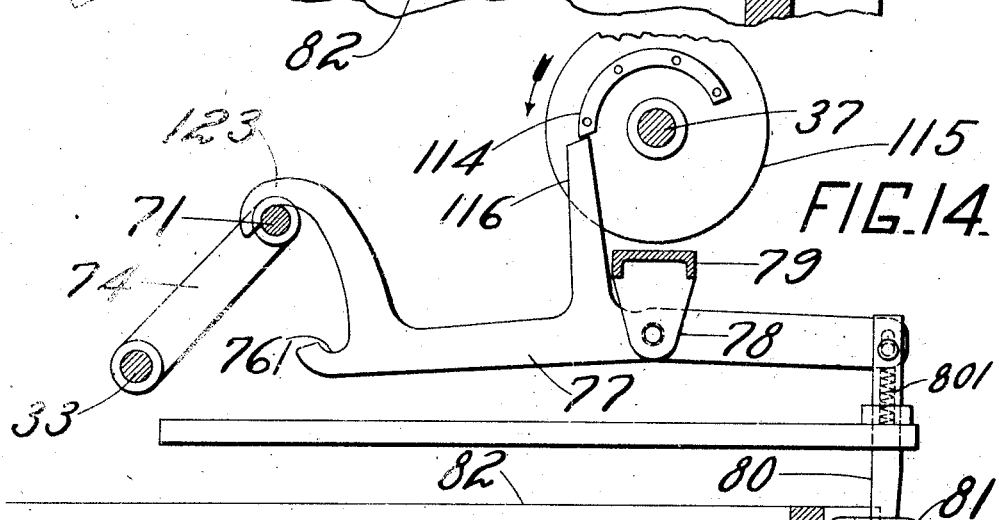

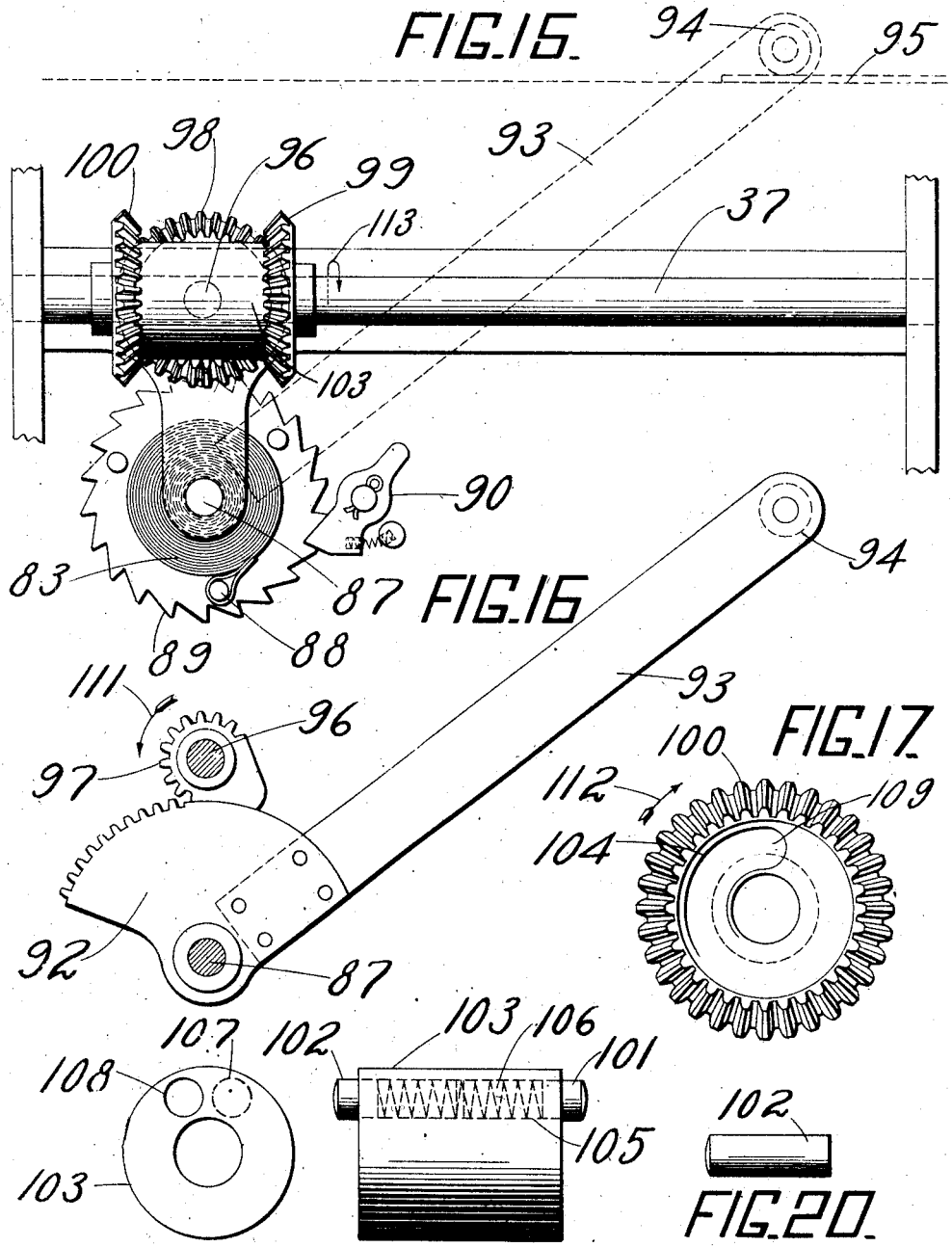

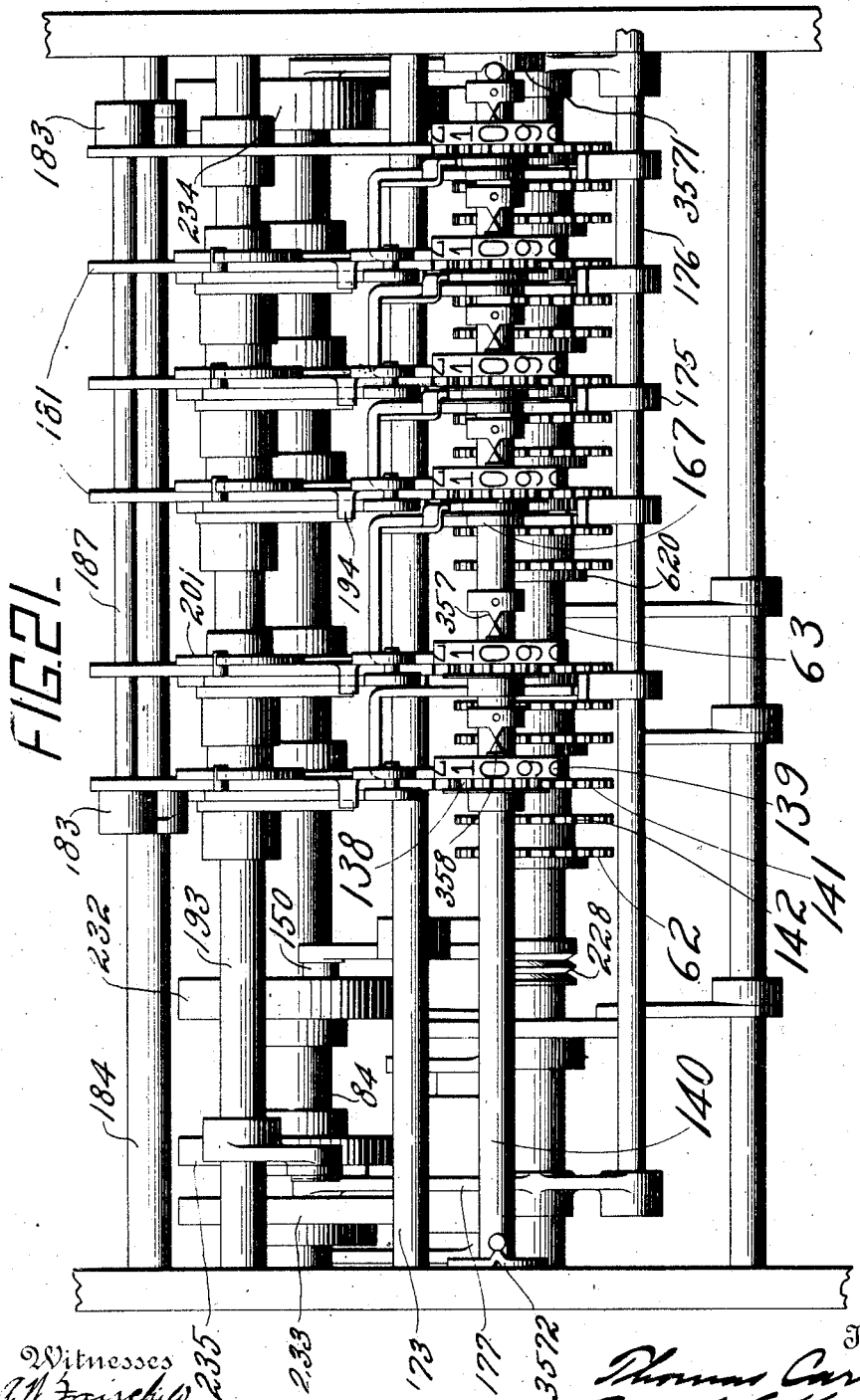

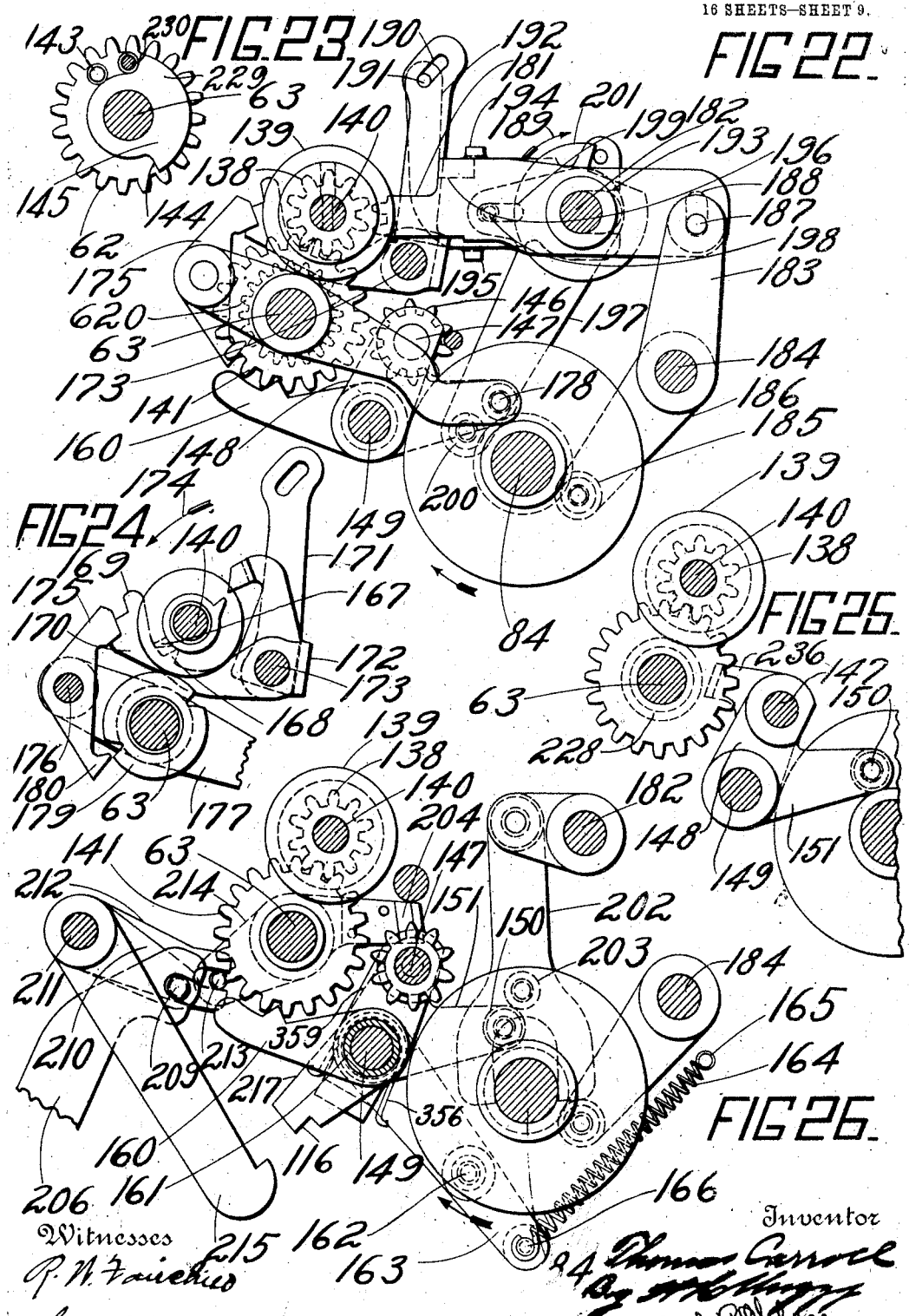

T. CARROLL.
CASH REGISTER.
APPLICATION FILED APR. 9, 1910.

1,054,672.

Patented Mar. 4, 1913.
16 SHEETS—SHEET 10.

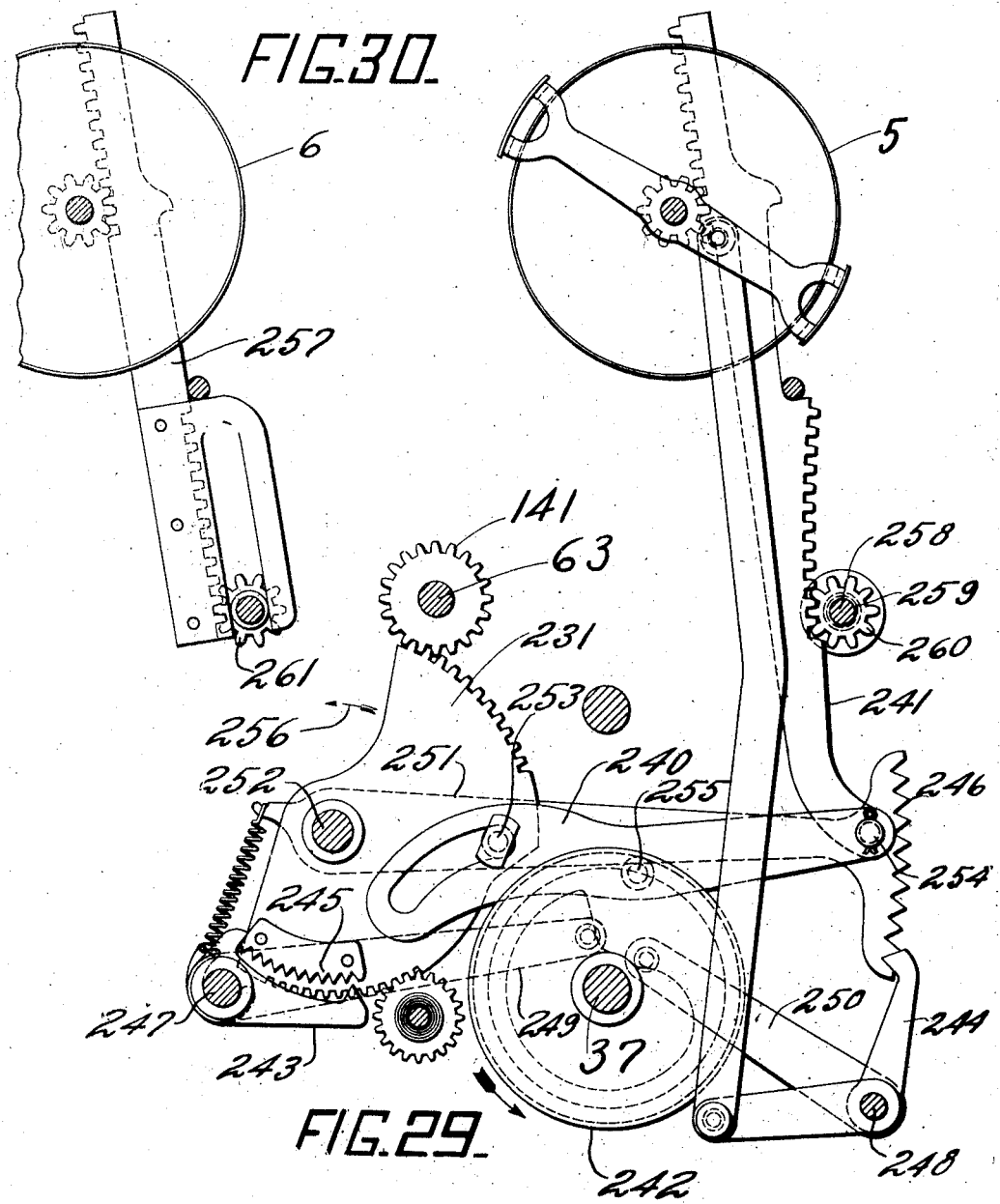

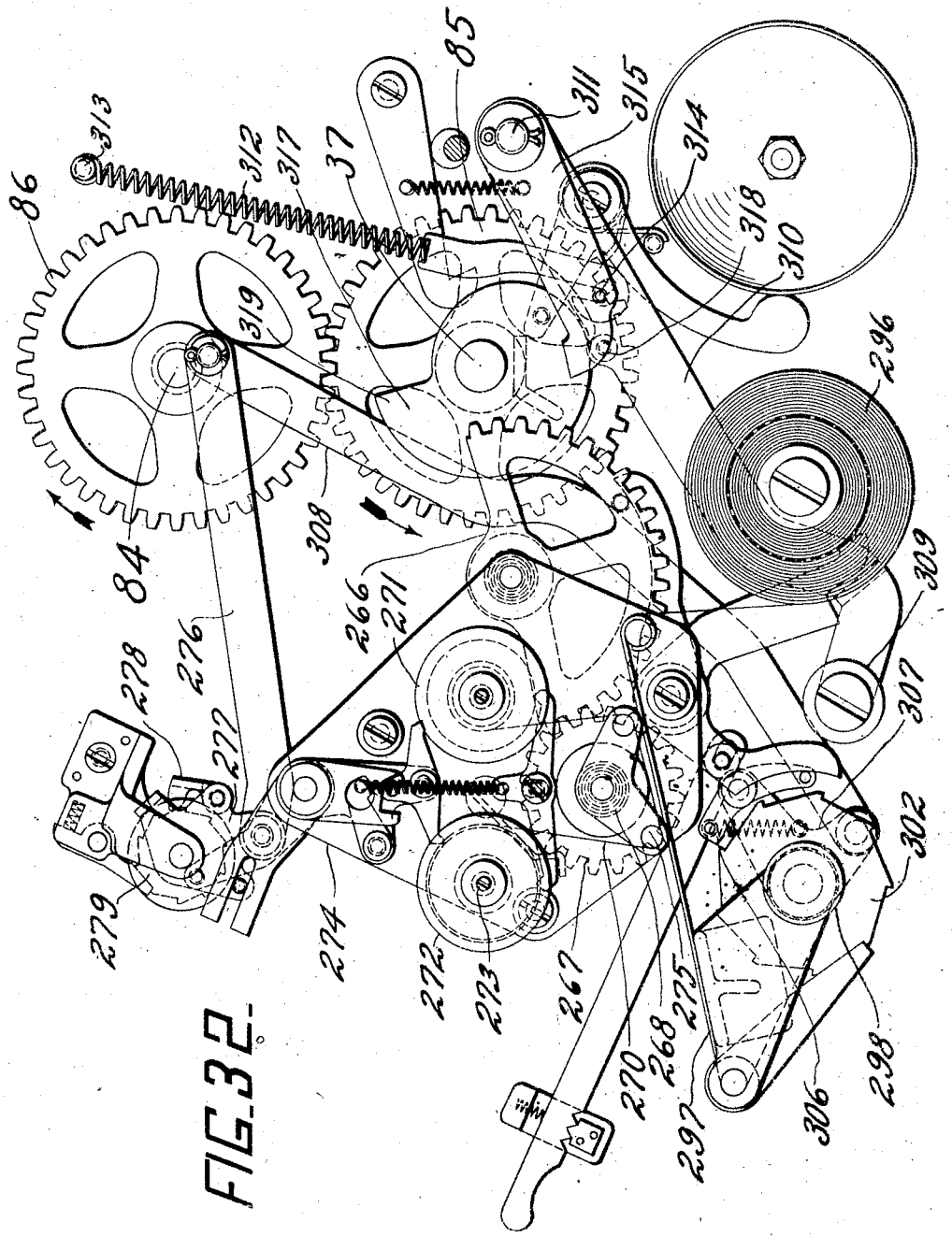

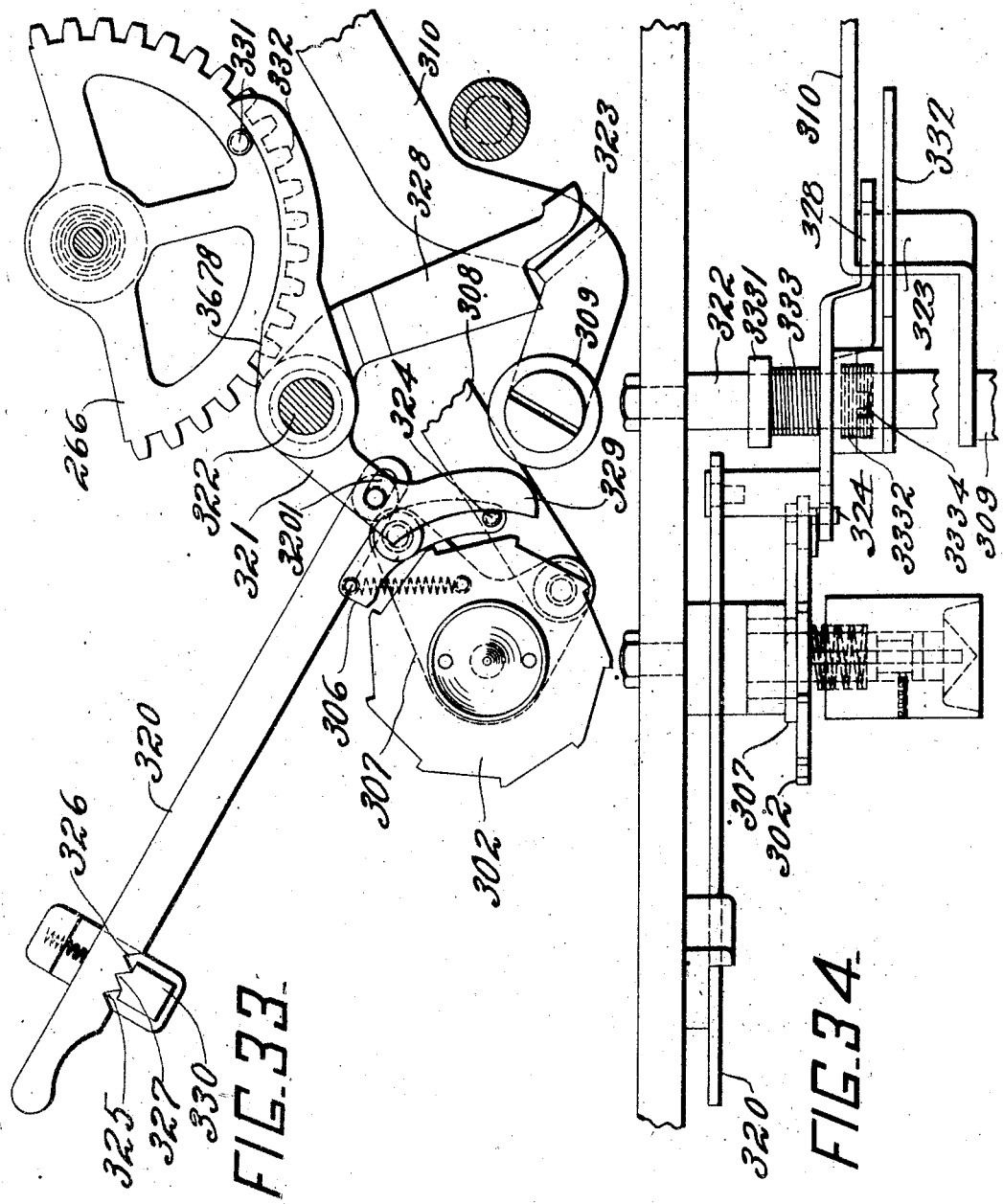

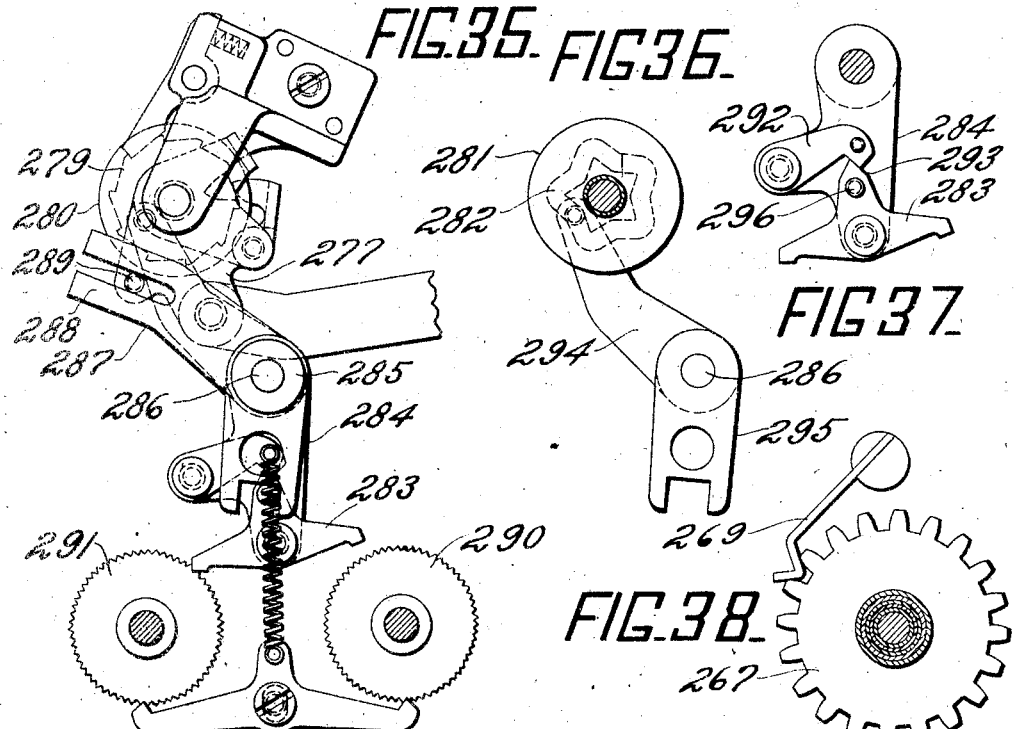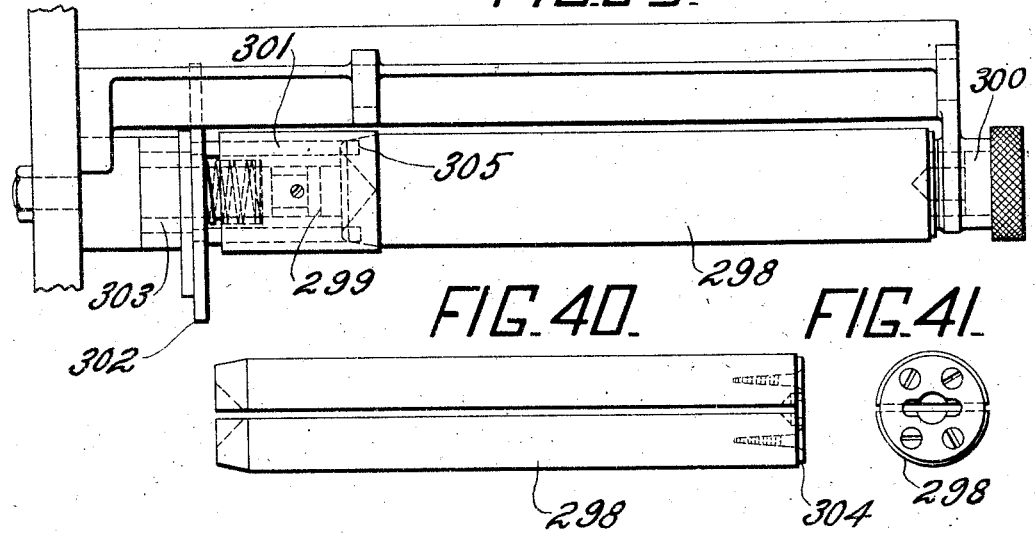

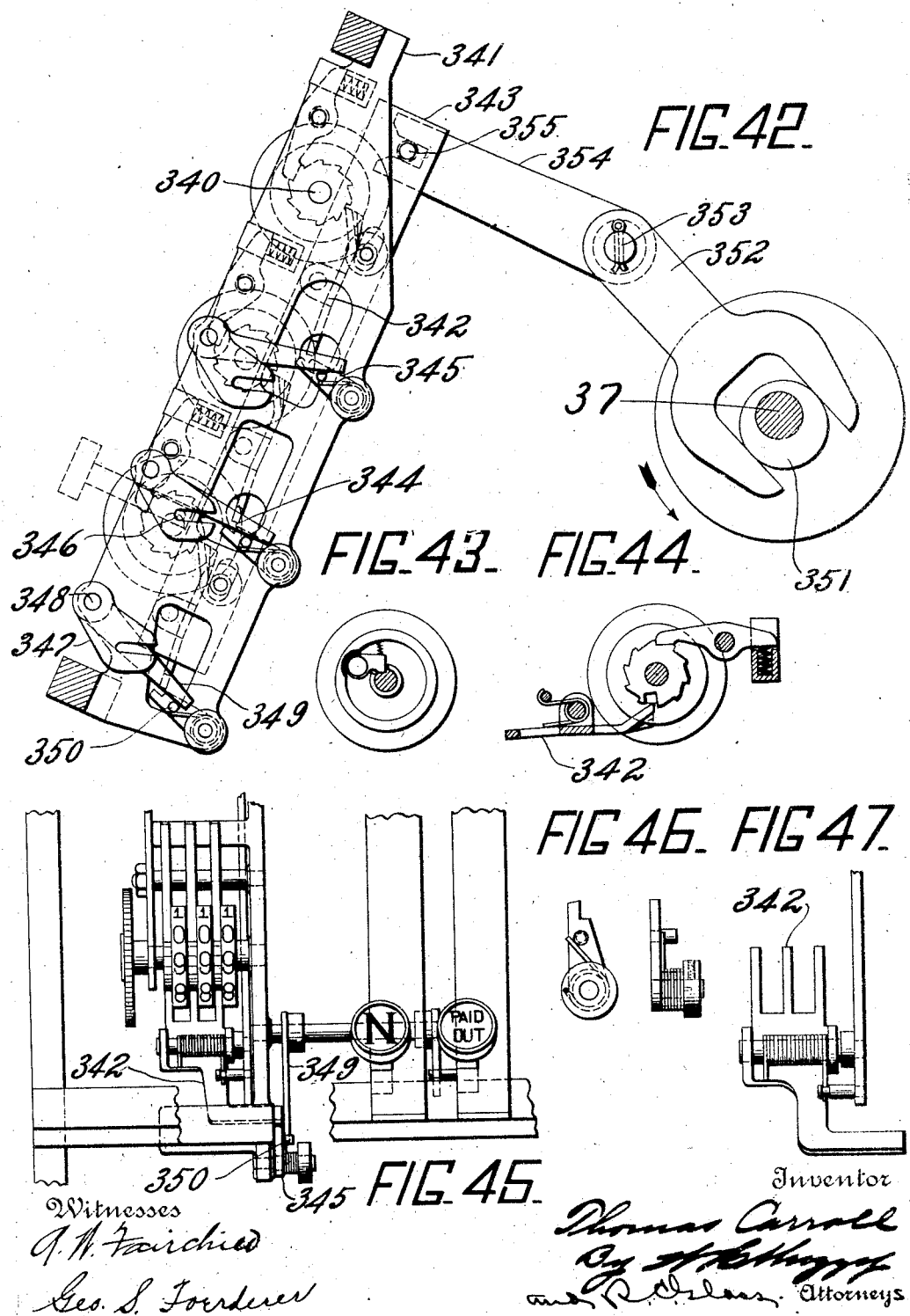

UNITED STATES PATENT OFFICE.

THOMAS CARROLL, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,054,672.  Specification of Letters Patent.  Patented Mar. 4, 1913.

Application filed April 9, 1910. Serial No. 554,393.

*To all whom it may concern:*

Be it known that I, THOMAS CARROLL, a citizen of the United States, residing at Oakwood, Dayton, in the county of Montgomery and State of Ohio, have invented certain new and useful Improvements in Cash-Registers, of which I declare the following to be a full, clear, and exact description.

This invention is an improvement in drawer operated cash registers. Registers of this type are usually arranged so that the reciprocation of the cash drawer is communicated to drive shafts to effect their oscillation, which oscillation in turn is employed to actuate accounting devices. The registering is accomplished upon the return strokes of the cash drawers, at which time spring power is stored for moving the drawers to open position upon succeeding operations.

It is among the objects of this invention to provide drawer connections with driving mechanism suitable for effecting rotation of drive shafts in contradistinction to rocking or oscillating drive shafts so that the drawer connections may be applied to any cash register having rotating drive shafts, to provide a drawer operated cash register in which the drawer moves to its open position at a predetermined velocity and in which registering is accomplished upon the out stroke of the drawer thereby insuring a uniform application of power at successive operations of the register.

Another object of the invention is to provide an autographic attachment with an arrangement for printing amounts, classes of transactions and salesman's identifying characters at the side of the autographic records together with a device controlling the autographic attachment whereby the printing mechanism and paper feeding device may be made inoperative regardless of the classes of transactions which are recorded, or inoperative when certain classes of transactions are recorded or certain modes employed of operating the machine.

Another object of the invention is to provide adjustable means for controlling the amount of power applied to the driving mechanism of the machine upon its operation.

Another object of the invention is to provide an ink ribbon feeding device in which changes of direction of feed is accomplished by an accounting device when the same arrives at a certain setting, thus economizing somewhat in reversing mechanism as the accounting device also performs another function, and providing a simple and reliable means for reversing the direction of the ink ribbon.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 2:
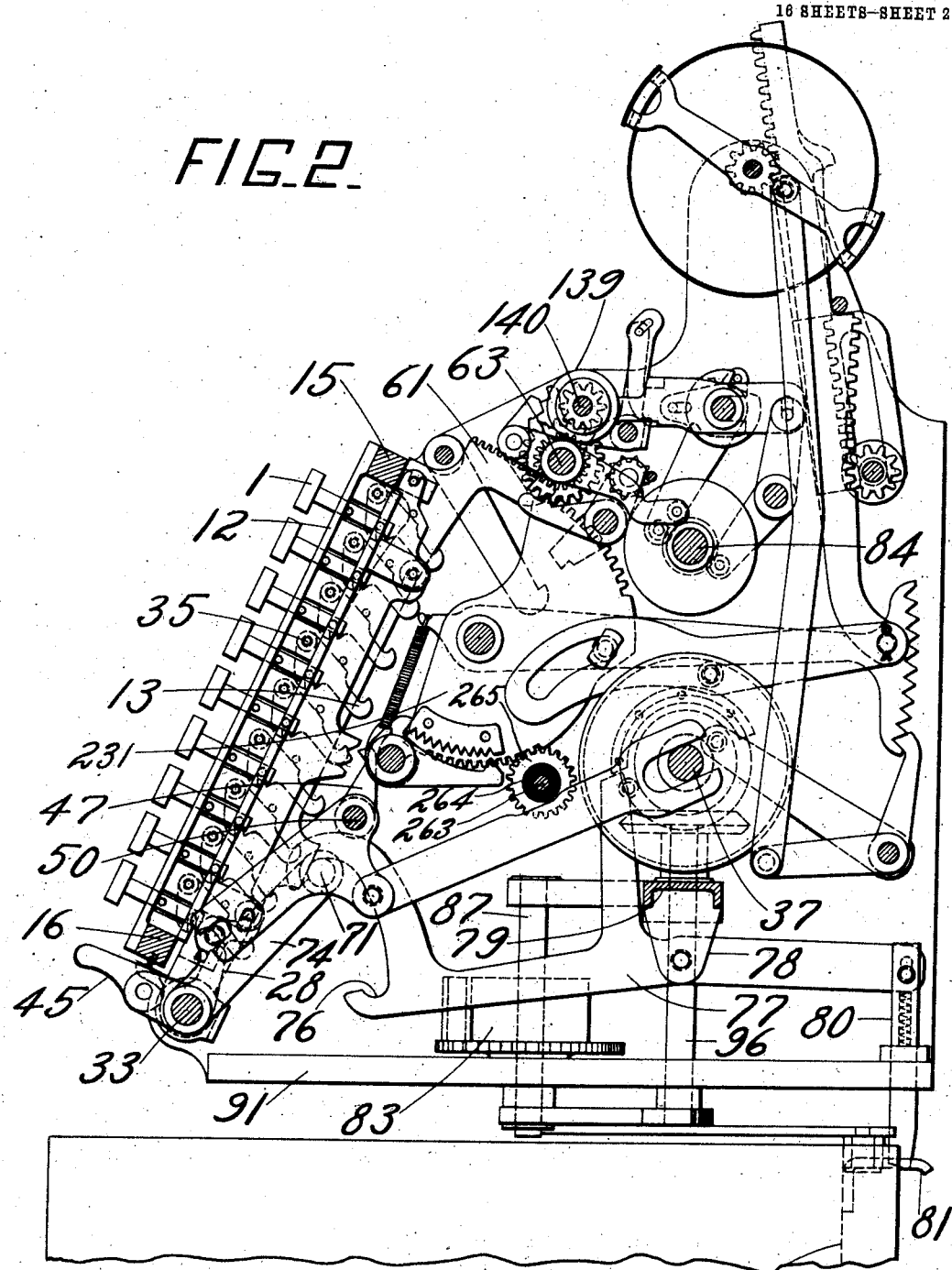
Figure 27:
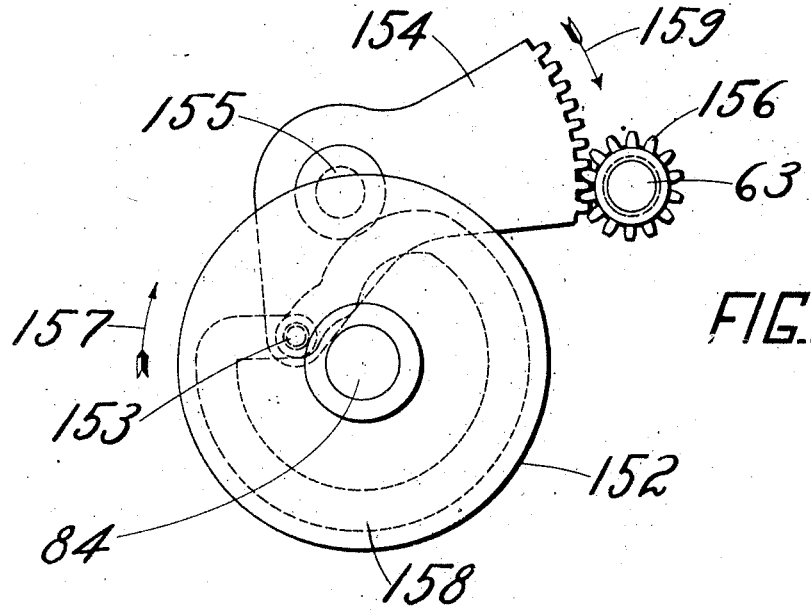
Figure 28:
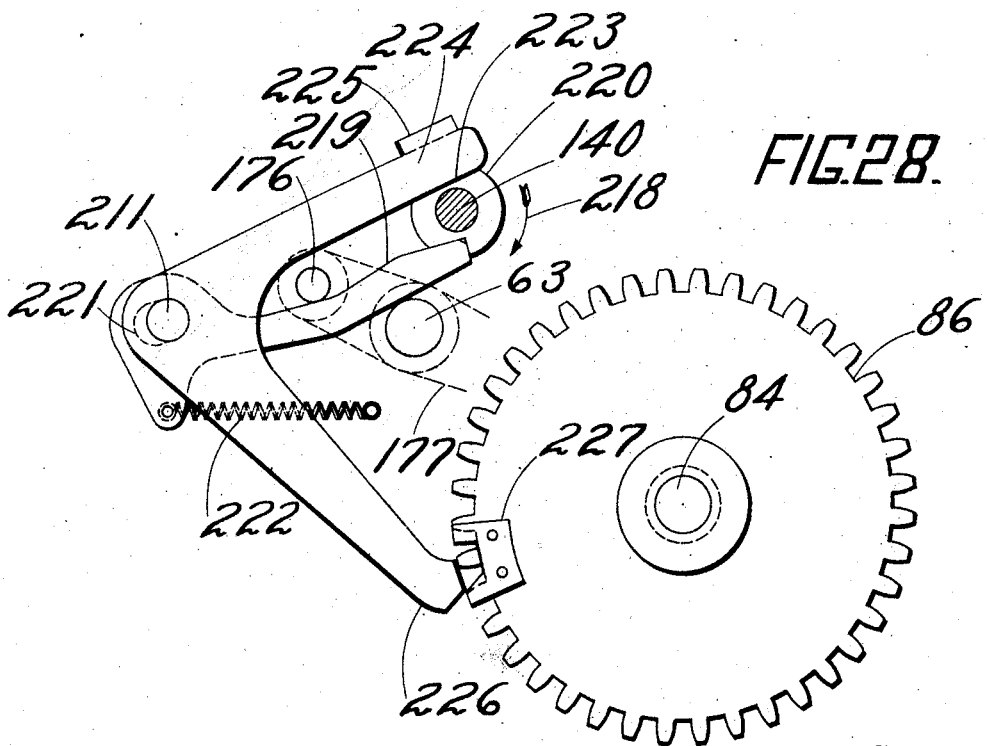
Figure 31:
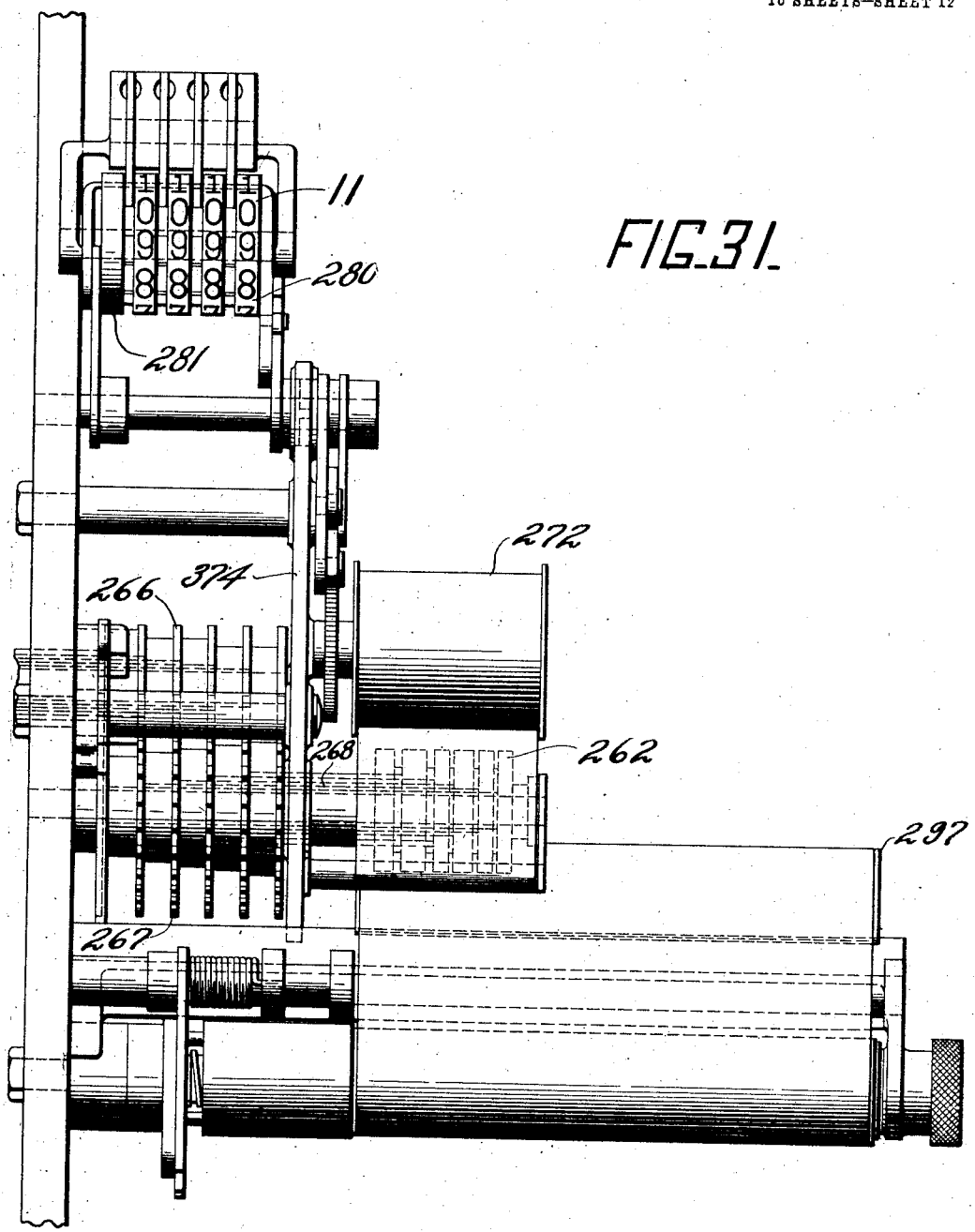

Figure 1 is a front elevation of a cash register constructed according to this invention with the cabinet, printer and cash drawer omitted. Fig. 2 is a right side elevation with the cabinet and right side frame omitted. Fig. 3 is a right side elevation of one of the banks of value keys. Fig. 4 is a right side elevation of the bank of transaction keys. Fig. 5 is a detail of one of the keys. Fig. 6 is a detail of one of the keys together with its supporting frame in section. Fig. 7 is a detail of a modified form of key releasing device. Fig. 8 is a detail right side elevation, partly broken away, of a bank of value keys and co-acting mechanism of the machine. Figs. 9 and 10 are details illustrating the manner in which a segment gear, which is shown in Fig. 8, is pivoted. Fig. 11 is a right side elevation of the base of a register together with the cash drawer. Fig. 12 is a plan view of a device which prevents sagging of the cash drawer when in its outer position. Fig. 13 is a detail in right side elevation of part of the main driving mechanism. Fig. 14 is a detail in right side elevation of the drawer release mechanism. Fig. 15 is a top plan view of the driving mechanism. Fig. 16 is a detail in plan of part of the driving mechanism. Fig. 17 is a detail in elevation of one of a pair of bevel gears in the driving mechanism. Fig. 18 is a side elevation of a pawl carrying device of the driving mechanism. Fig. 19 is a front elevation of the same. Fig. 20 is a detail of a pawl of the driving mechanism. Fig. 21 is a plan view of the totalizer and its actuating mechanism. Fig. 22 is a transverse vertical section of the totalizer. Fig. 23 is a detail of part of the totalizer driving mechanism. Fig. 24 is a detail of the transferring mechanism of the totalizer. Fig. 25 is a detail of part of the totalizer mechanism. Fig. 26 is a detail of another part of the totalizer mechanism. Fig. 27 is a detail of the totalizer driving mechanism. Fig. 28 is a detail of the totalizer resetting mechanism. Fig. 29 is a detail in right side elevation of one unit of the indicator setting mechanism. Fig. 30 is a detail of part of the indicator mechanism. Fig. 31 is a front elevation of the printer and autographic attachment. Fig. 32 is a right side elevation of the printing mechanism. Fig. 33 is a detail in right side elevation of a controlling device for the printing mechanism. Fig. 34 is a plan view of the mechanism shown in Fig. 33. Fig. 35 is a detail in right side elevation of an ink ribbon feeding device. Fig. 36 is a detail illustrating part of the mechanism by which the direction of feed of the ink ribbon is reversed. Fig. 37 is a detail of an actuating pawl for the ink ribbon feeding device. Fig. 38 is a detail of an alining device for type carriers. Fig. 39 is a plan view of a receiving roll for a strip of detail or autographic paper. Fig. 40 is a detail in front elevation of a receiving roll. Fig. 41 is an end view of the receiving roll. Fig. 42 is a right side elevation of the transaction counters. Figs. 43 and 44 are details of a transaction counter. Fig. 45 is a front elevation of a transaction counter and connections with a transaction key. Fig. 46 is a detail of one of a set of retaining pawls which co-act with counter actuating pawls. Fig. 47 is a detail of one of the counter co-acting pawls.

In order to carry out the objects above stated the machine is provided with several banks of value keys, a bank of transaction keys and a bank of initial keys. Each bank controls a differential segment which is constructed to be latched in normal position by a key detent, and to be spring operated for its differential setting. Each key carries a pivoted pawl which is positioned when the key is depressed to stop the spring operated motion of the differential segment at the corresponding point. Thus the key controls the movement of the segment but is not obliged to furnish power to move it, and, therefore a light and easy key action is obtained.

The differential segments are normally held in zero position by a frame bar, and this bar is held in position by a locking arm under the control of the detents for the transaction and initial banks of keys, and thus the machine cannot be operated until a key in each of these two banks is actuated, though they may be actuated successively or simultaneously, and neither bank is locked until a key in the other bank is depressed.

The connections from the differential segments to the printer and to the indicators will be described in detail but it may here be stated that they are similar in general to those shown in a pending application filed by Thomas Carroll on June 10, 1909, Serial No. 501,235, and that a device similar to that shown herein for preventing or permitting the feed of a record strip, is also described in said pending application.

Referring to the drawings, the general arrangement of the machine may be seen from Fig. 1 in which the numeral 1 indicates four banks of value keys; 2, a bank of transaction keys; 3, a bank of clerks' initial keys; 4, a totalizer; 5 and 6, two sets of value indicators; 7, a transaction indicator; 8, a clerk's initial indicator; 9, a set of racks for actuating the indicators; 10, special transaction counters; and 11, a customer counter.

A printing device and autographic attachment is located at the right of the register and is shown partly broken away in Fig. 1. Fig. 31 illustrates the printer and autographic attachment in front elevation.

The various units of mechanism of the register will be described in the following order; keyboard and differential mechanism, driving mechanism, main totalizer, indicator mechanism, printing mechanism and autographic attachment, and special transaction counters.

*Keyboard and differential mechanism.—* All of the banks of value keys and the bank of initial keys are identical in structure. Fig. 3 illustrates one of these banks of keys. Each bank comprises a supporting frame 12 in which the keys are slidably mounted, a plurality of dogs 13 pivoted to the frame, and a key detent 14. The frames 12 are secured to the machine tie bars 15 and 16. Each key carries a limiting pin 17 and a determining pin 18. The pins 17 limit the outward movement of the keys by engagement with the frame 12 and the pins 18 extend through slots 19 in the dogs 13 and across the front edge 20 of the key detent 14 opposite slots 21 in the key detent. The slots 21 are suitably inclined so that when a key is depressed its determining pin 18 will pass into an adjacent slot 21 of the detent 14 while the latter is being moved upwardly by the dog 13, coöperating with the depressed key, engaging with a pin 34 projecting from the detent 14. Each slot 21 is so inclined that the walls thereof, by engaging the key pin 18 of the depressed key, will hold said key in its operated position while the detent 14 is in its elevated position. Each of the detents 14 is slidably mounted upon the frame 12 by pins 22, which project from the frame through slots 23 in the detent. A spring 24 is tensioned between a pin 25 on the detent and a pin 26 on the frame. When a key is depressed the rise of the key detent causes the slots 21 thereof to move out of co-acting relation with the remaining pins 18 and the front edge 21 of the detent then acts as a stop for the pins 18 and thus prevents the depression of another key in the bank until the key detent is restored to its lower or home position.

The detent 14 carries a locking pin 27 which when the key detent rises permits a retaining arm 28 to swing forwardly under the action of the spring 29 bringing its shoulder 30 beneath the pin 27 and thereby retaining the key detent in its upper position. The retaining arm is provided with a tongue 31 which extends into a groove 32 in a shaft 33 but the groove in the shaft 33 is broad enough to permit the above mentioned movement of the retaining device 28 independently of the shaft but at each operation of the machine and after the function of the depressed key is accomplished, the shaft 33 is oscillated far enough to restore the retaining arm 28 to its initial position thereby permitting the key detent 14 to be restored to its lower position by action of the spring 24. The restoring of the detent causes any depressed key to be restored to its outer or undepressed position by pins 34 on the detent which extend across the upper edges of the dogs 13. As the detent lowers the pin 34 rocks the dog around its pivot 35 to its original position and as the determining pin 18 of the respective key extends through an elongated notch 19 in the dog, the depressed key is returned to its outer position.

By reference to Figs. 3 and 4, it will be noted that the dogs 13 are mounted upon the frames 12 above the keys with which they coöperate and the weight of the dogs is to the rear of their pivoted points so that said dogs have a tendency due to gravity to rotate in a clockwise direction and thereby hold the keys in their outer positions. By thus holding the unoperated keys in their outer positions all danger is removed of an unoperated key moving inwardly by gravity when the detent 14 is elevated by the operation of another key in the same bank. It will be seen that by this construction the dogs 13 which control the differential movement of an operating element, as hereinafter described, also take the place of the individual key springs usually employed so that a single spring 24 with the assistance of the dogs 13 answers for the purpose of restoring the keys to their normal position.

The shaft 33 is oscillated at the required time by a box cam 36 which is carried by a main drive shaft 37 (Fig. 8), though the groove is not shown. It is connected by a pitman 38 and a lever 39 which is pivoted to the frame of the machine by a stud 40, to an arm 41 fast on the shaft 33.

The construction of the retaining arm 28 is such that it may be rocked rearwardly before the operation of the machine for the purpose of releasing a depressed key independently of the oscillation of the shaft 33. To this end a pair of arms 42 are loosely journaled on the shaft 33 and are connected together by a rod 43 which extends beneath the forwardly extending parts 44 of the retaining arms 28 and one of the arms 42 is provided with a handle 45. If this handle is lifted upwardly before the driving mechanism of the register is operated the rod 43 engages all the retaining arms 28 rocking the same away from the pins 27 of the key detent, thereby permitting the detents to return to their initial positions, which causes the depressed keys also to return to their initial positions. Thus the operator may correct mistakes in depressing keys, as by the handle 45 all depressed keys are released. But if desired, keys may be released individually by providing the forwardly extending part 44 of each retaining arm 28 with a handle 46 as indicated in the modification shown in Fig. 7.

During actuation of the driving mechanism it is impossible to move any of the key detents 14 either for the purpose of releasing keys or depressing keys, as locking pawls 47 are then rocked into engagement with one or the other of a pair of notches 48 or 49 in the detents 14. The pawls 47 are actuated by a spring 53 (Fig. 4), but latched and restored by a shaft 50 upon which all of the pawls 47 are rigidly mounted and which carries an arm 51 (Fig. 8) connected by a pitman 52 to a cam carried by the drive shaft 37. The shaft 50 also carries an arm 54 (Fig. 8) provided with a shoulder 55 coacting with a gravity or spring operated latch 56 which is loosely journaled upon the shaft 33. When the pawls 47 rock into engagement, the latch 56 engages the arm 54 and retains the pawls in such position the required length of time. Before the pitman 52 is actuated to restore the pawls 47 to their original positions the latch 56 is restored to its initial position as will be hereafter described.

The spring 53 (Fig. 4) is prevented from rocking the shaft 50 for the purpose of carrying the pawls 47 into engagement until one of the transaction keys 2 and an initial key have been depressed. The key detent 57 (Fig. 4) of the bank of transaction keys is provided with a shoulder 58 normally in engagement with the nose of a pawl 59 also carried fast on the shaft 50 and the initial key detent has a corresponding shoulder. The depression of a transaction or an initial key causes the corresponding detent 57 to rise in the same manner as the depression of the value key causes one of the detents 14 to rise. When both transaction and initial detents 57 are in their upper positions notches 60 in the detents come opposite the nose of the pawl 59 thereby permitting the shaft 50 to be rocked by the spring 53. As the rocking of the shaft 50 and its latching by latch 56 prevents further manipulation of the keys, it is essential that the correct value keys be depressed before a transaction and an initial key are depressed.

The function of the dogs 13 has not yet been stated, except the incidental function performed by these dogs in aiding the restoration of the depressed keys to their initial position. The main purpose of the dogs is to regulate the extents of movement of differential segment gears 61 (Fig. 8) all of which mesh with pinions 620 fixed to gears 62 loosely journaled upon a shaft 63 and idly rotated upon the rearward movement of the segment gears 61. The segment gears are provided with a plurality of pins 64 coacting with the dogs 13. When a key is depressed the respective dog 13 for such key rocks upwardly bringing its shoulder 65 into the path of movement of one of the pins 64 and thereby serves as a stop to limit the rearward movement of the segment gear. The pins 64 are located at varying distances from the shoulders 65 of the dogs 13 in such manner that if the uppermost key of a bank is depressed the segment gear for such bank will be permitted to rock rearwardly only one unit of its nine units of movement. The keys of higher value in the bank permit the segment gear to move a greater number of units according to their value.

The gears 62 are operatively connected with various accounting devices of the register when the segment gears 61 are at rest in their set positions, these devices being operated upon the return of the segments.

The segments 61 are moved rearwardly by springs 66 (Figs. 9 and 10) which are coiled around the shaft 33 and bear between collars 67 fast on the shaft and yokes 68 which are loose upon the shaft and provided with shoulders 69 extending over yokes 70 integral with the segment gears 61. The springs 66 through the yokes 68 normally urge the segment gears 61 to rock rearwardly and the segment gears 61 are returned by independent means as will be pointed out further on but the springs 66 are tensioned at another time than at the return of the segment gear 61, for the purpose of more equally distributing the load. The shaft 33 is slightly rotated in the direction of movement of the segment gears 61 during the return of the segment gears, but slightly in advance of the segments and when the segment gears are in their home position, the shaft 33 is slightly rotated in an opposite direction to its original position thus tensioning the springs 66, and releasing the depressed keys as previously described.

The segment gears 61 are normally held in their home positions by pins 236 on the key detents 14 extending into notches 237 in lugs carried by the segments 61 and by a rod 71 which extends across the rear edge of shoulders 72 on the segment gears. The pins 236 are disengaged from the segment by the rise of their respective detents through the depression of keys. The rod 71 also extends across the rear edge of a shoulder 73 on the latch 56 and holds this latch out of engaging position until the depression of an initial key so that keys may be released before the depression of the initial key, but are prevented from being released after the depression of an initial key. The rod 71 is carried by a pair of arms 74 which are loosely pivoted upon the shaft 33 and the rod is held in its forward position as shown in Fig. 4, by a catch 75 which is rigid with the shaft 50. This shaft is slightly rotated, as before mentioned, at the depression of an initial key and at this time carries the catch 75 away from an extension 76 of one of the arms 74. When this occurs, the frame, which includes the rod 71 and arm 74, drops rearwardly with the shaft 33 as a pivot and the rod 71 strikes a hook shaped end 761 (Fig. 14) of a lever 77 which is pivoted to a lug 78 of a tie bar 79. The lever 77 carries at its rear end a drawer latch 80 and it is struck with sufficient force by the rod 71 to lift the drawer latch 80 out of latching engagement with a bracket 81 carried by a cash drawer 82.

*Driving mechanism.*—The various registering devices of the machine are actuated by power supplied to the drive shaft 37 and another drive shaft 84 (Fig. 2). These shafts carry all of the main operating cams of the machine and drive the cams by making one rotation at each operation of the machine. The shaft 37 receives movement from a main spring 83 and the cash drawer 82 and transmits movement to the shaft 84 through gears 85 and 86 (Fig. 32). The shafts 37 and 84 are each caused to make one-half of a rotation during the opening movement of the cash drawer and the remaining half during the closing movement of the cash drawer. Power is applied to the machine by the closing of the cash drawer, at which time, while the shafts 37 and 84 are making the latter half of their rotation, the spring 83 is tensioned for service in the succeeding operation of the machine.

The majority of cash registers are driven by means of rotative drive shafts, but drawer operated cash registers have been usually actuated by oscillating shafts because of the ease in which the reciprocative movement of the drawers may be transmitted to oscillating shafts. But this latter method limits the usefulness of drawer actuated driving mechanism to machines with oscillating driving shafts. It will be seen from the following description that the drawer mechanism of the present invention is applicable for driving any cash register in which the main drive shafts are rotative shafts and, as stated, the majority of cash registers have such drive shafts.

The spring 83 is normally under tension and when the cash drawer is released, the spring 83 drives the drawer to its open position through a shaft 87 to which one end of the spring 83 is secured. The other end of the spring is secured to a pin 88 fast on a ratchet wheel 89 loose upon the shaft 87 and co-acting with a retaining pawl 90 pivoted to a supporting base 91 of the register. When the machine is assembled the ratchet 89 is adjusted with respect to the pawl 90 to give the required tension to the spring 83, but the tension of the spring may readily be changed by moving ratchet 89.

Shaft 87 carries a segment gear 92 to which is secured an arm 93 which at its rear end carries a roll 94 coacting with a plate 95 on the cash drawer to drive the cash drawer to its open position. When the cash drawer is released the spring 83, through the shaft 87 and arm 93, forces it to its open position and at the same time causes the segment gear 92 to rotate a shaft 96 which carries a mutilated pinion 97 meshing with the segment-gear 92. The shaft 96 (Figs. 13 and 15) also carries a bevel gear 98 which meshes with two bevel gears 99 and 100 journaled loosely upon the drive shaft 37 and operatively connected with this shaft by plungers 101 and 102, which are slidably mounted in a cylinder 103 rigid with the shaft 37, and co-acting with annular grooves 104 of gradually increasing depth in the faces of the gears 99 and 100. The plungers 101 and 102 are spring pressed toward their respective gears respectively by springs 105 and 106 bearing between the inner ends of the plungers and the inner ends of holes 107 and 108 in the cylinder 103. The holes are offset as indicated in Fig. 18 merely to permit maximum length of the plungers and the springs.

The gears 99 and 100 have their grooves cut oppositely so that when they are placed on the shaft 37 facing in opposite directions the grooves will extend in the same direction. When the shaft 37 is in normal position the plungers 101 and 102 will both be in the deep parts of grooves 104 at about the point indicated by numeral 109. When the drawer opens shaft 96 rotates in a direction indicated by arrow 111 and therefore gear 99 rotates as indicated by arrow 113 while gear 100 rotates in the opposite direction. Therefore, plunger 101 is engaged by the end of the groove 104 and the cylinder 103 is rotated with the gear in the direction of arrow 113. Meanwhile gear 100 is rotating oppositely to gear 99 and its groove 104 rubs past plunger 102 finally forcing this roller out of the groove on to the flat face of gear 100. As plunger 102 and gear 100 each make a half rotation in opposite directions while the drawer is opening, they have a complete rotation relative to each other, and thus plunger 102 drops again into groove 104 in gear 100, when the drawer reaches its open position. When the drawer is closed plunger 102 is driven by groove 104 in gear 100, thus giving shaft 37 an additional half rotation in the same direction as before, and the reverse half rotation of groove 104 in gear 99 again brings the deep part of this groove into connection with plunger 101. Thus plungers 101 and 102 are alternately driven by gears 99 and 100, each plunger and its groove acting practically like a ratchet and pawl connection, though each gear has the equivalent of one tooth only, and thus the drive shafts 37 and 84 are rotated one complete rotation at each operation of the machine.

During the outward movement of the drawer and lever 93, the drawer releasing lever 77 is held in its unlatching position by a semiannular flange 114 (Fig. 14) which is carried by a disk 115 secured to the drive shaft 37. The flange 114 for this purpose co-acts with an extension 116 of the lever 77. The flange 114 constitutes a full stroke device which compels the drawer to move to its fully open position and thereby compels a half rotation of the drive shaft 37 before the drawer may be latched in its home position. It may be seen from Fig. 14 that this novel full stroke mechanism is far superior to the ordinary pawl and rachet full stroke devices, as it is noiseless and there is practically no chance of the full stroke device in any way becoming jammed and thereby interfering with the proper and easy operation of the machine. At the proper time the arm 77 is rocked back to its original latching position by the rod 71 which is carried by the arms 74. The rod 71 is actuated by a snail cam 117 (Fig. 8) which co-acts with a roller 118 carried by a pitman 119 which pitman is connected at its outer end to a lever 120 loosely pivoted upon the shaft 50 and notched at 121 for the reception of a pin 122 carried by one of the arms 74. The normal position of the cam 117 is as shown in Fig. 8 and it therefore does not interfere with the lowering of the rod 71, but when the cam 117 forces pitman 119 forwardly it causes the lever 120 to be rocked so as to carry the arm 74 and the rod 71 back to their original position. This movement of the rod disengages the latch 56 which releases the key detent by permitting the shaft 50 to assume its normal position and at the same time that the latch 56 is engaged by the rod 71 the rod engages a hook 123 (Fig. 14) on the lever 77 rocking this lever to position for latching the cash drawer when it reaches its inner position.

Figs. 11 and 12 illustrate a device for preventing sagging of the cash drawer when in its outer position. This device consists merely of a heavy metal bar 124 slidably mounted beneath a plate 125 secured to the register base 126. The cash drawer is provided with a flanged plate 127 which upon the outward movement of the drawer engages a pawl 128 on the bar 124 forcing the bar outwardly into supporting position for the drawer. The bar 124 is provided with a stop 136 for engagement with a cushion 137 on the base 126 to limit the outward movement of the bar and is guided in its movement by a pin 131 on the plate 125 which extends through a slot 132 in the bar 124 and before the drawer reaches its extreme outer position an angular part 133 of the slot 132 engages the pin 131 thereby rocking the bar to carry the pawl 128 away from the plate 127 permitting continued outward movement of the drawer. The bar at this time rocks from the fulcrum formed by edges 134 of the plate 125 and is moved rearwardly to its home position at the return of the drawer by engagement with a lug 135 on the cash drawer.

*Totalizer.*—The amounts of all "cash" and "received on account" sales are added together by the totalizer 4. Other classes of sales are recorded by the printing mechanism, or if desired additional totalizers may be provided, but in the drawings one totalizer only is shown.

The totalizer of the present machine is substantially like that shown and described in the patent application before referred to but certain co-acting devices are omitted and the operation of certain other related devices such as the restoration to normal position of the main actuating segments of the machine, and the longitudinal shifting of certain co-acting broad pinions is accomplished in a different manner.

The totalizer comprises a plurality of pinions 138 which are rigid with number drums 139 and are journaled upon a shaft 140. Each pinion 138 meshes with a gear 141 journaled upon the shaft 63 at the right of the gear 62 which meshes with the segment gear 61 (Fig. 8) of the respective denomination of such pinion. Between each pair of gears 62 and 141 is a gear 142 (Fig. 21) also journaled upon the shaft 63. The gears 142 mesh with large segment gears 231 (Figs. 2 and 29) which serve to set the indicators and the type wheels of the printing mechanism and these segment gears and the pinions 138 of the totalizer are differentially rotated according to the extents that the gears 62 are differentially rotated by the segment gear 61. Intermediate broad pinions 146 serve to transmit the differential setting of the gears 62 to the totalizer pinions and the segment gears 142 upon restoring gears 62 to normal position, but all that occurs upon the rearward movement of the segment gear 61 is the differential setting of the gears 62. These gears 62 carry pins 143 (Fig. 23) which when the gears are rotated by the segment gears 61 move more or less toward shoulders 144 c out of disks 145 rigidly secured to the shaft 63. After the gears 62 have been differentially set, the broad pinions 146 (Fig. 22) are carried into mesh with the gears 62, 142 and 141 thus connecting these gears together in sets of three. The broad pinions 146 are journaled upon a rod 147 carried by a pair of arms 148 secured to a shaft 149 and this shaft is rocked to carry the broad pinions into and out of mesh at the required times by a cam 232 (Fig. 21) fastened to the drive shaft 84. This cam, not illustrated in detail in the drawings, acts upon a roller 150 carried by a rearward extension 151 of one of the arms 148. When the broad pinions are in mesh the shaft 63 is rotated about 180 degrees oppositely to the direction in which the gears 62 were originally rotated by the segment gears 61. Upon this half rotation of the shaft 63 the disks 145 engage the pins 143 of the gears 62 in whatever position the gears may be in and return them and segments 61 to their original or zero positions. As the gears 62 are at this time in mesh with the broad pinions 146 their companion gears 142 and 141 will be rotated similar extents but this rotation is away from normal position and thereby causes the desired differential rotation of the totalizer pinions and the segment gears 142 (Fig. 29). The shaft 63 is rotated for this purpose by a cam 152 (Fig. 27) which is carried by the drive shaft 84 and acts upon a roller 153 carried by a segment gear 154 pivoted to the frame of the machine upon a stud 155 and meshing with a pinion 156 fast on the shaft 53. The drive shaft 84 rotates in the direction indicated by arrow 157 and it may be seen from the formation of race 158 in the cam 152 that the segment gear 154 will be rotated in the direction indicated by arrow 159 at the beginning of the operation of the machine and that the segment gear will be held in this position during the greater part of the rotation of the shaft 84. Near the completion of the rotation of the shaft 84 the segment gear 154 is returned to its original position thereby reversely rotating the shaft 63 to its original position at which time shoulders 229 engage pins 230 on the gears 142 returning the segments 231 and type-carriers to normal position. The broad pinions 146 do not mesh with the gears 62, 140 and 141 when the shaft 63 is returned to its original position and therefore the setting of the totalizer pinions is not disturbed by the return of the shaft. Accidental rotation of the totalizer pinions during the return of the shaft 63 is prevented by toothed members 181 described further on and accidental rotation of the totalizer pinions when the machine is at rest in its home position is prevented by pawls 160 which are carried by a sleeve surrounding the shaft 149 and a coiled spring 356 surrounding shaft 149 and fastened at its ends to sleeve 161 and an arm 163 loose upon the shaft, serves to normally hold the pawls in engagement with the gears 141 but at the required time a cam secured to shaft 84 rotates away from a roller 162 on arm 163 thus releasing the tension of spring 356. Arm 163 is aided in its upward rocking by a spring 164 extended between a frame pin 165 and a pin 166 on arm 163.

The carrying operations of the totalizer are accomplished by the following mechanism: Each totalizer pinion has fast thereto a transfer trip cam 167 (Fig. 24) so located with respect to the numbers of its respective drum 139 as to engage a nose 168 on a transfer trip pawl 169 when its drum passes from the nine to the zero position. Each trip pawl 169 comprises a pair of arms 170 and 171 connected by a yoke 172 and is loosely pivoted upon a rod 173. The pawls, when engaged by a trip cam 167 are rocked in the direction indicated by arrow 174 (Fig. 24) and are retained in their tripped position by spring pressed pawls 175 which are carried by a rod 176 carried by a pair of levers 177 pivoted upon the shaft 63 and which at their rear ends carry rolls 178 extending into races of cams 233 and 234 (Fig. 21) fixed to the drive shaft 84. These cams are to rock the pawls 175 away from the transfer pawls 169 at about the completion of operations of the machine to permit the transfer pawls 169 to be restored to their original position after the function of the pawls is accomplished.

The gears 141 with which the totalizer pinions 138 mesh have fast thereto notched disks 179, which normally prevent the pawls 175 from being rocked upon their pivots and thereby prevent accidental movement of the trip pawls 169, but when a totalizer pinion arrives at the proper position for transferring one of the notches in the disk 179 will arrive opposite a nose 180 of its co-acting pawl 175 and permit the rocking of the pawl.

The trip pawls control the actuation of toothed operating members 181 (Fig. 22). At every operation of the machine after the totalizer pinions have been operated by the differential mechanism the members 181 are projected forwardly into mesh with the totalizer pinions. These members are slidably mounted upon a shaft 182 and are projected forwardly and returned to initial position by arms 183 carried fast on a shaft 184 and this shaft is rocked by a cam 2041 carried by the drive shaft and co-acting with a roll 185 on an arm 186 also fast to the shaft 184. The operating members 181 are connected with the arms 183 by a rod 187 passing through vertical slots 188 in the members 181. This arrangement permits the members 181 to be oscillated upon the shaft 182, and to effect a carrying operation when desired ones of the members 181 are rocked in the direction indicated by arrow 189.

The vertical arms 171 of the transfer pawls are provided with slots 190 which are circular to the shafts 182 and through these slots extend pins 191 carried by tripping slides 192 provided with elongated slots 193 through which the shaft 182 extends for the purpose of supporting the same. The toothed operating members 181, excepting the one which co-acts with the totalizer pinion of lowest order, are provided with flanges 194 and 195 respectively extending across the upper and lower edges of the slides 192. The trip slides 192 are provided at their upper edges with notches 196 and when the operating members 181 are projected forwardly the flanges 194 come above the notches 196 and accordingly when the slides 192 are rocked in the direction indicated by the arrow 189 they will not normally move the operating members 181 but when a trip pawl 169 is rocked in the direction indicated by the arrow 174 (Fig. 24) its engagement with the pin 191 of the trip slide 192 causes the slide to be moved forwardly so that when the operating member 181, located at its side, is projected forwardly it will again be in co-acting relation with the flange 194 of such member 181 and, therefore, when the slide 192 is rocked in the direction indicated by the arrow 189, its respective toothed member 181 will be rocked upwardly and thereby rotate the totalizer pinion with which it meshes, one tooth space.

The trip slides 192 are rocked upwardly and returned by bell crank levers 197 which carry pins 198 extending through elongated slots 199 in the slides 192 and which also carry rolls 200, co-acting with successively acting cams on the drive shaft 84. The slides 192 are not returned until after the toothed members 181 have been moved out of engagement with the totalizer pinions, but when returned serve to rock the members 181 back to original positions by engagement with the flanges 195 and are slid rearwardly to their original positions by cams 201 carried by the shaft 182 which is oscillated for the purpose of permitting the forward movement of the members 192 and for compelling the return of the same by a pitman 202 (Fig. 26) actuated by a cam 235 (Fig. 21) on the drive shaft 84 co-acting with a roll 203 on the pitman. The rearward movement of the members 192 compels the restoration of the transfer pawls through the pins 191.

The totalizer may be disconnected from the differential mechanism whenever certain of the special keys are depressed, or any of the special keys except the cash key, though it is sometimes preferred to have both "cash" and "received on account." amounts added to the main totalizer. This disconnection may be accomplished by causing the broad pinions to be shifted in a longitudinal direction to the left when it is desired to disconnect the totalizer from the differential mechanism. The gears 141 which mesh with the totalizer pinions are normally opposite the right hand end of the broad pinions and by shifting the broad pinions slightly to the left they will not mesh with the gears 141 when rocked forwardly. The shifting of the broad pinions is accomplished by moving a bent arm 204 (Fig. 26) into the path of co-acting inclined shifting members carried by the shaft 147 and when the arm 204 has caused the shifting of the broad pinions the broad pinions as shifted are rocked into mesh at which time an alining tooth 236 extending from one of the arms 148 enters one of two grooves 228 in a fixed collar on shaft 63 and thereby insures correct alinement.

The arm 204 is rocked into co-acting position by a slide 206 which is controlled in its action by the bank of special or transaction keys (Fig. 4). The dogs 13 of any of the bank of transaction keys may be provided with pins 207 which extend beneath shoulders 208 on the slide 206, and thus when certain transaction keys are depressed the slide 206 is shifted upwardly. This slide is connected by a pin 209 (Fig. 26) with an arm 210 fast on a shaft 211, which carries a forked arm 212 connected by a pin 213 with an extension 214 of the arm 204. It follows that the shaft 211 is rocked by the rise of the slide 206 in the proper direction for moving the arm 204 downwardly into co-acting relation with the inclined members 359 on shaft 147. The shaft 211 also carries a hook 215 which when the shaft is so rocked engages a shoulder 216 on an arm 217 which is carried by the sleeve 161 and thereby prevents movement of the pawls 160 which are also carried by the sleeve. By this means, whenever the totalizer is not actuated at an operation of the machine, accidental rotation of the totalizer pinions is positively prevented.

There are four banks of value keys in the register shown in the drawings and it is therefore necessary to have four broad pinions 146. The totalizer elements of higher order are not operated directly from the keyboard but are merely for the purpose of receiving transfers from the pinions of lower order. In the present case there are six denominational elements to the totalizer and the gears 62 which mesh with the segment gears 61 under the control of the bank of transaction keys and the bank of special keys, are made inoperative in regard to the main totalizer by omitting broad pinions opposite these particular gears 62.

The totalizer is reset by fitting a key to the end of the totalizer shaft 140 (Fig. 21) then shifting the shaft by cams 3571 and 3572 in the direction of its length thereby bringing teeth 357 into the same vertical planes with teeth 358 extending from the totalizer drums. The shaft is then rotated in the direction indicated by arrow 218 (Fig. 28) so that the totalizer pinions are backwardly rotated to zero positions.

Fig. 28 is a detail illustrating part of the resetting mechanism for the totalizer. Before the shaft 140 may be rotated it is necessary to operate the machine in order to move a stop 219 out of the path of a notched disk 220 which is carried fast on the totalizer shaft. When the rod 176 is rocked downwardly upon an operation of the machine, as previously described, it causes the stop 219 to be rocked downwardly. The stop 219 is pivoted upon the shaft 211 but is provided with an elongated slot 221 to permit a certain longitudinal movement of the stop and when rocked out of the path of the cam 220 it moves rearwardly propelled by a spring 222. The resetting of the totalizer brings the stop 219 and disk 220 back to their original relation and it then is necessary to operate the machine before the totalizer can again be reset.

The disk 220 is provided with a flat surface 223 upon which rests an arm of a machine lock 224. The cabinet lid of the register normally rests upon a flange 225 of the machine lock and it is therefore necessary to unlock and raise the lid before the totalizer may be reset. The resetting of the totalizer causes the disk 220 to rock the machine lock 224 so that its lower end 226 will enter a cut in a plate 227 of the gear 86. This is a safeguard to prevent operation of the machine while the totalizer is being reset.

*Indicator mechanism.*—The indicators are arranged in two sets so that they may be viewed from both the front and rear of the register and are always set according to the manipulation of the keys. The amount indicators are, of course, set to correspond with the amount which is added to the totalizer. In the present invention it is the aim to provide an indicator mechanism of the class which causes the indicators to move directly from one reading to another, constructed as simply as possible.

The indicator mechanism is not broadly new, the principle of operation being described in several former applications. Briefly stated it comprises for each denominational order a beam 240 (Fig. 29) pivotally connected at one end by pins 253 to one of the segments 231 of the differential mechanism, at its other end by pin 254 to an indicator setting rack 241, and midway between its pivots carries a roller 255 co-acting with a cam 242 fixed to the drive shaft 37. The segments 231 and indicator racks 241 when differentially set are respectively alined by pawls 243 and 244 co-acting with alining teeth 245 and 246 and fixed to rods 247 and 248 provided with arms 249 and 250 extending into operative relation with cams on drive shaft 37. The alining teeth 246 are cut in arms 251 loosely pivoted upon shaft 252 and pivotally connected with the beams 240 and the indicator setting racks 241 by the pins 254. The cams 242 have peculiarly cut grooves into which rollers 255 extend to permit free movement of rollers toward the centers of the cams, when the cams are in normal position, but to return the rollers a definite distance away from shaft 37 upon rotation of the shaft.

In operation the alining pawls 244 are first rocked out of engagement with teeth 246 and then the differential rotation of segments 231 in the direction indicated by arrow 256 rocks the beams 240 either around the pivots 254 or around the rollers 255 with the outer edges of the grooves in cams 242 as fulcrums but the point of fulcrum is immaterial as the segments 231 differentially set the pivots 253 so that the beams will be rocked to desired angular positions either entirely by movement of segments 231, or by movement of the segments in combination with action of the cams 242 on the rollers 255 moving them to their normal distance away from shaft 37. The extent of rocking of any beam 240 is determined by the particular angular setting of its respective segment 231 and the angular setting of the beam before being actuated. The rocking of the beams moves racks 241 up or down causing the desired setting of the indicators, rotating them from their previous settings to their new settings without first returning them to zero position. By this arrangement of indicator setting mechanism the return of segments 231 to normal position does not effect the setting of the indicators as then the beams 240 merely idly rock downward around their pivots 254 and accordingly the segments 231 may be returned at any desired time.

Movement of the indicator racks 241 is communicated to racks 257 (Fig. 30) for setting the set of indicators 6, by a rod 258 and sleeves 259 of different lengths surrounding the rod and having at opposite ends pinions 260 and 261 meshing with the racks 241 and 257.

*Printing mechanism and autographic attachment.*—The printing mechanism is arranged to print detailed records of transactions when desired upon a strip of paper suitably extending to the right of the printing mechanism over a writing platform for receiving written records or notations at the right of the printed records. It is provided with an adjustable device for making the printing mechanism operative or inoperative and which may also be positioned to cause the printing mechanism to be normally inoperative, but to be operative when other than cash transactions are recorded. This adjustable device is therefore cooperatively related to the bank of transaction keys. Type-wheels 262 (Figs. 31 and 32) are set by gear connections with the segments 231. These gear connections consist of a shaft 263 and concentric tubes 264 (Fig. 2) which carry pinions 265 meshing with the segments 231 and at their right hand ends carry segments 266 (Fig. 32) meshing with pinions 267 fast upon tubes 268 which also carry the type-wheels 262. The type-wheels are alined in their set positions by an alining device 269 (Fig. 38) co-acting with the pinions 267.

An ink ribbon 270 (Fig. 32) for the printing mechanism is carried by a pair of spools 271 and 272 journaled upon short shafts 273 extending from a frame 274 which aids in supporting the printing mechanism. The ink ribbon passes from one roll around a pair of rolls 275 located at each side of the type-carriers to the companion spool.

A counting device for counting the operations of the machine is located above the printing mechanism and is actuated by drive shaft 84 through a pitman 276 which is eccentrically connected to the drive shaft at one end and at its other end is pivotally connected with an arm 277 which carries actuating pawls 278 for the counter. The counter consists of a plurality of ratchets 279 co-acting with the pawls 278 and drums 280 fixed to the ratchets. The drum 281 of highest order (Figs. 31 and 36) is provided with a cam groove 282 of star shape for the purpose of actuating an ink ribbon reversing mechanism. One or the other of the ribbon carrying spools is rotated to feed the ink ribbon by a double pawl 283 (Fig. 35) pivoted to an arm 284 which is carried by a sleeve 285 surrounding a shaft 286. The sleeve 285 also has fixed thereto an arm 287 provided with a slot 288 through which extends a pin 289 on the pawl carrying arm 277, the rocking of which was previously described. Therefore upon the rocking of arm 277 the arm 284 is rocked, causing the pawl 283 to engage one or the other of two ratchet wheels 290 and 291 secured to the ink ribbon spools 271 and 272. The particular ratchet thus engaged depends upon the angular setting of pawl 283. Fig. 37 illustrates how pawl 283 is held in position to engage one or the other of the ratchet wheels 290 and 291 by a spring drawn pawl 292. Pawl 283 is rocked to carry its nose 293 to one side or the other of the nose of pawl 292 to reverse the direction of feed of the ink ribbon by the cam groove 282 acting upon an arm 294 fixed to shaft 286 together with a forked arm 295. This arm when rocked in one direction or the other by cam 281 engages a pin 296 on pawl 283 thereby setting the pawl to such position that the direction of feed of the ink ribbon is reversed.

The paper upon which the printed and written records are made leads from a supply roll 296 (Fig. 32) over a writing platform 297 and beneath the type-wheels 262 to a receiving roll 298. The receiving roll 298 is illustrated in detail in Figs. 39, 40, and 41. It is removably mounted upon a spring pressed spindle 299 and a fixed spindle 300. The spindle 299 is slidably mounted on a pair of pins 301 extending from a ratchet wheel 302 loosely journaled upon a stub shaft 303. The receiving roll 298 is provided with a metal disk 304 at one end which is suitably notched to co-act with pins 305 on the spindle 299 so that the receiving roll will be rotated upon rotation of ratchet wheel 302 and is split along its length as indicated in Fig. 40 to attach conveniently the end of a strip of record paper to the roll.

The ratchet wheel 302 (Fig. 33) is rotated by a pawl 306 carried by a bell crank lever 307 pivoted upon the stub shaft 303. One arm of the bell crank lever is pivoted to a pitman 308 actuated by drive shaft 84 through an eccentric connection with the drive shaft as shown in Fig. 32.

Writing platform 297 is cut away below the type-wheels 262 to permit a platen 309 to force the strip of record paper against the type-wheels to effect impressions. The platen 309 is carried by an arm 310 pivoted by pin 311 to the frame of the machine and is normally urged upwardly by a spring 312 extended between a pin 313 extending from the frame of the machine and a pin 314 extending from an arm 315 to which the platen carrying arm 310 is connected by a coil spring 316 surrounding shaft 311. The arms 310 and 315 are normally held in their lower positions against the action of springs 312 and 316 by a snail cam 317 secured to drive shaft 37 and co-acting with a roller 318 on the platen arm 310. After the type-wheels have been properly set a shoulder 319 of cam 317 clears the roller 318 permitting the platen arm to swing upwardly and effect an impression. The operation of the platen may, however, be prevented by a manually adjustably link 320 (Fig. 33). The link 320 has a lost motion connection 3201 with a bell crank lever 321 loosely pivoted upon a shaft 322 and extending downwardly from the shaft to near a bent part 323 of the platen arm 310 and a pin 324 on pawl 306 and is provided with three notches 325, 326, and 327 co-acting with a fixed lug 330 so that the link may be retained in any one of three possible positions. With link 320 in such position that notch 326 engages lug 330, arm 328 of the bell crank lever 321 extends over the part 323 of the platen arm 310 and arm 329 of the bell crank lever engages pin 324 of pawl 306 holding the pawl out of co-acting relation with the ratchet wheel 302. Therefore when the bell crank lever 307 is rocked the record paper will not be fed forward and when the shoulder 319 of cam 317 clears roller 318 the platen arm will still be retained in its normal position.

The bell crank 321 is moved into the position shown in Fig. 33, by a spring 333, Fig. 34, which is coiled about the shaft 322, with its ends secured to a collar, fastened to the shaft and to one of the arms of the bell crank 321.

By shifting the link 320 so that its notch 325 engages the lug 326 the bell crank lever 321 is rocked against the tension of spring 333, out of engagement with pin 324 of the pawl 306 and also out of engagement with the platen arm, thus permitting the operation of the paper feeding mechanism and printing mechanism upon operations of the machine.

When the link 320 is in its central position as shown in Fig. 33, the platen 309 and the strip feeding mechanism will be rendered operative only when a transaction other than "cash" or "received on account" is to be entered. To this end an arm 332 is loosely mounted on shaft 322 and is normally forced against a pin 331 on the transaction segment 266 by a spring 3332, which is coiled about shaft 322 within recesses formed in the hubs of the bell crank 321 and arm 332, Fig. 34. The ends of the spring 3332 are secured to the shaft 322 and the hub of the arm 332, and the tension of this spring is much greater than the tension of spring 333 for a purpose hereinafter described. A tongue and groove connection 3334, Fig. 34, with a small amount of lost motion, is provided between the hubs of the bell crank 321 and arm 332, so that the bell crank may move independently of the arm 332. When a special transaction such as "charge" or "paid out" is entered in the machine, with the link in the position shown in Fig. 33, the pin 331 will pass above the edge 3678 of the arm 332, the latter then being rocked in an anti-clockwise direction by the spring 3332; and said arm 332, through the tongue and groove connection 3334 will rock the bell crank in a similar direction and thereby carry the arms 328 and 329 respectively, of said bell crank, out of engagement with offset 323 of the platen arm 310 and pin 324 of the strip feed pawl 306. Upon the return of the segment 266 to normal position the pin 331 will rock the arm 332 to the position shown in Fig. 33 and the bell crank 321, through spring 333, will follow said arm independently of the link 320 owing to the lost motion connection 3201 between said link and bell crank. When it is desired to record all transactions the link 320 is moved inwardly until the lug 330 engages notch 325 formed in the link by which movement the bell crank will be rocked against the tension of its spring 333 and thereby render operative the platen and strip feeding mechanisms by moving the arm 328 of the bell crank away from the offset 323 of the platen arm 310 and arm 329 away from the pin 324 of the feed pawl 306. This movement of the bell crank 321 is independent of the arm 332 and is permitted by the lost motion connection 3334 between said bell crank 321 and arm 332.

*Special transaction counters.*—The machine is provided with special transaction counters, as illustrated in Figs. 1 and 42 to 47 inclusive. The counters are journaled upon rods 340 carried by a fixed frame 341 and are actuated by multiprong pawls 342 carried by a reciprocating member 343. The pawls are normally urged by springs into engagement with their respective counters but upon reciprocation of the member 343 engage at their lower ends notches 344 in arms 345 pivoted to the frame 341 and upon the reciprocation of the member 343 the arms 345, rocking around their pivots, normally cause the pawls 342 to rock out of engagement with their respective counters. The special transaction keys are so arranged that when depressed they will rock the particular arm 345 of their respective counters out of operative relation with a pawl 342 for such counter so as to permit the pawl to actuate the counter upon the reciprocation of the member 343. To this end each of the special transaction keys carries a pin 346 extending through a slot inclined to the direction of movement of the key in an arm 347 which is pivoted to frame 341 by a pin 348 and has fast thereto an arm 349 also pivoted upon the pin 348. Each arm 349 extends over a pin 350 on one of the arms 345. The depression of a special transaction key, through the camming connection between its pin 346 and the slot in arm 347, causes the arms 347 and 349 to be rocked downwardly thereby forcing the coöperating pin 350 out of co-acting relation with the counter pawl and permitting the operation of a counter.

The pawl carrying member 343 is reciprocated by an eccentric 351 on the drive shaft 37 acting upon a pitman 352 pivoted to the machine frame by a pin 353 and fast to an arm 354, also pivoted upon the pin 353. The member 343 has a pin 355 extending through a notch in the arm 354. Accordingly when shaft 37 is rotated the member 343 will be reciprocated as desired.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a machine of the class described, the combination with a series of depressible keys, of means for retaining said keys in depressed positions, intervening devices between the keys and the retaining means and actuated by the keys to move the said means into position for retaining the depressed key, and a single spring connected to the retaining means and acting to return the latter and the depressed key to normal positions.

2. In a machine of the class described, the combination with a series of depressible keys, of a sliding plate for retaining said keys in depressed positions, intervening devices between the keys and plate and actuated by the keys to move the plate into position for retaining the depressed key, means for latching the retaining plate in adjusted position, and a single spring for returning the depressed key and the retaining plate to normal positions.

3. In a machine of the class described, the combination with a bank of keys, and pivoted arms connected to and rocked by said keys, of a plate moved by said arms, and a spring connected to restore said plate to normal position after it has been moved by said key operated arms.

4. In a machine of the class described, the combination with a bank of keys, and pivoted arms connected to and rocked by said keys, of a sliding plate moved by said arms and having edges for obstructing said keys, and a spring connected to said plate to restore it to normal position after it has been moved by said key operated arms.

5. In a machine of the class described, the combination with a bank of keys, having pins thereon, of pivoted arms having slots surrounding said pins, a sliding plate having pins engaged by said pivoted arms, a device for holding said plate in adjusted position after it has been moved by said pivoted arms, and a spring connected to said plate, whereby to restore said plate and said keys to normal position.

6. In a machine of the class described, the combination with a bank of keys, and a notched plate moved by depression of said keys and serving to retain them in depressed position, of a pivoted arm positioned to move into the notch in said plate, and means for locking said arm in its moved position.

7. In a machine of the class described, the combination with a bank of keys, and a notched plate moved by depression of said keys and serving to retain said keys in depressed position, of a pivoted arm positioned to move into the notch in said plate, a bar constructed to lock said arm in its moved position, and connections from a movable part of the machine for releasing said locking bar.

8. In a machine of the class described, the combination with a bank of value keys and a bank of special keys, of a plate for each bank, moved by the depression of keys of its bank and serving to retain the keys in depressed position, the value plate having two adjacent notches and the special plate having one notch, rigidly connected arms positioned to engage the notch in the special plate when the same has been moved by its keys and to engage the proper one of the notches in the value plate depending on whether the same has been moved or not, and means for locking said arms in their moved positions.

9. In a machine of the class described, the combination with a bank of keys and a notched plate moved thereby, of an arm positioned to move into the notch in said plate when the same has been moved by the keys, a main operating mechanism for the machine, with means normally locking the same, and connections controlled by said arm for releasing said locking means.

10. In a machine of the class described, the combination with a main operating mechanism for the machine, and a bar normally locking the same, of a frame positioned to move to engage and release said bar, a bank of keys, and an arm permitted to move when any key of said bank is operated, said arm positioned to engage and actuate said frame.

11. In a machine of the class described, the combination with a main operating mechanism for the machine, and a bar normally locking the same, of a frame positioned to move to engage and release said bar, and an arm normally locking said frame, a bank of keys, a device rigidly connected to said locking arm, and key controlled devices permitting said connected device to move when any of the keys are depressed.

12. In a machine of the class described, the combination with a main operating mechanism, and means normally locking the same, of a weighted device positioned to move and release said locking means, a bank of keys, and key controlled means normally locking said weighted device against movement.

13. In a machine of the class described, the combination with a registering device, of driving mechanism therefor, a cash drawer having connections to operate the driving mechanism, a latch for retaining the cash drawer in its closed position, and a device actuated by the driving mechanism for moving the latch out of operative position and holding the same out of said position until the driving mechanism has operated to a predetermined extent.

14. In a machine of the class described, the combination with a main operating mechanism for the machine, a spring for driving said mechanism, and a cash receptacle and connections therefrom for tensioning said spring, of a latch for the cash receptacle, manipulative devices and connections therefrom for releasing said latch, and an element connected to said main operating mechanism and serving to retain said latch in releasing position.

15. In a machine of the class described, the combination with an operating mechanism having an invariable movement at each operation of the machine, of a spring for partially actuating the operating mechanism, and a reciprocatory member for completing the movement of the operating mechanism and for tensioning the spring.

16. In a machine of the class described, the combination with an operating mechanism having an invariable movement at each operation of the machine, of a spring for partially actuating the operating mechanism, a reciprocatory member for completing the movement of the operating mechanism and for tensioning the spring, and a ratchet and pawl connection whereby the tension of the spring may be varied.

17. In a machine of the class described, the combination with an accounting device, and actuating mechanism for the same, of means for driving the actuating mechanism including a rocking bevel gear, a drive shaft and a pair of bevel gears journaled thereon, each of which meshes with the rocking bevel gear, and one way driving connections between said shaft and said pair of bevel gears whereby the oscillation of the gears causes rotation of the drive shaft.

18. In a machine of the class described, the combination with a main operating mechanism for the machine including a main shaft, of a pair of driven gears loosely mounted on said shaft and having oppositely directed one way acting driving connections thereto, a driving gear continuously connected to each of said pair of gears, and means, including a cash receptacle, for oscillating said driving gear.

19. In a machine of the class described, the combination with an accounting device and actuating mechanism for the same, of a slidable cash drawer, a supporting frame for the cash drawer and a slide carried by said frame, and means carried by the drawer for causing the slide to move outwardly upon the outward movement of the drawer and then to be disengaged from the drawer and permit further movement of the latter independent of the slide, the slide serving in projected position to aid in supporting the drawer when opened.

20. In a machine of the class described, the combination with a printing mechanism including a type-carrier, of an ink ribbon feeding device, and a counting device having connections for controlling the ink ribbon feeding device for the purpose of changing its direction of feed when a predeterminate number of operations of the counting device have occured.

21. In a machine of the class described, the combination with a main operating mechanism, and a counter having denominational elements, and connected to be actuated by said operating mechanism, of an ink ribbon feeding mechanism including parts adjustable to vary the direction of feed of the ribbon, connections from said main operating mechanism to actuate the feeding mechanism, and connections from a denominational element of said counter to shift said adjustable parts.

22. In a machine of the class described, the combination with a bank of keys, and hooks pivoted thereto, of a differential rack segment, having pins positioned to be obstructed by said hooks, and accounting devices operable by said rack segment.

23. In a machine of the class described, the combination with a bank of keys, and hook arms having slot and pin connections to said keys, of a differential segment having pins positioned to be obstructed by said hooks, a spring for moving said segment, and accounting devices operable by said rack segment.

24. In a machine of the class described, the combination with a bank of keys, and pivoted devices pinned to said keys, of a differential segment having projections positioned to be obstructed by said pivoted devices, a plate actuated by said pivoted devices and serving normally to lock said differential segment, and accounting devices operable by said segment.

25. In a machine of the class described, the combination with a bank of keys, and pivoted stopping arms pinned to said keys, of a plate moved by said stopping devices, a differential rack segment normally locked by said plate and having projections positioned to be obstructed by said stopping arms, a spring for moving said rack segment after the same has been released by said plate, and accounting devices operable by said rack segment.

26. In a machine of the class described, the combination with an operating mechanism having an invariable movement at each operation of the machine, of a spring for partially actuating the operating mechanism, a cash receptacle and connections for completing the movement of the operating mechanism and for tensioning the spring.

27. In a machine of the class described, the combination with a rotary operating shaft, of a pair of gears loosely mounted upon said shaft and having a one way connection therewith, a reciprocatory cash receptacle, and connections between the cash receptacle and the pair of gears for converting the reciprocatory movement of the cash receptacle into a rotary movement of the operating shaft.

28. In a machine of the class described, the combination with a bank of depressible keys, of a differentially movable element, devices engaged and actuated directly by the keys for arresting said element, and latching means for the differential element controlled by the keys, the said latching means also retaining the keys in their depressed positions.

29. In a machine of the class described, the combination with type carriers, of a platen for taking impressions upon a record strip from said type carriers, mechanism for feeding the record strip, and an adjustable manipulative device controlling the platen and feeding mechanisms in such a manner that said platen and feeding mechanism may be rendered operative or inoperative upon the entering of all transactions, or said platen and feeding mechanism may be rendered operative upon the entering of certain transactions and inoperative when other transactions are entered.

30. In a machine of the class described, the combination with type carriers, of a platen for taking impressions upon a record strip from said type carriers, mechanism for feeding the record strip, and an adjustable slide having three positions, in the first of which it prevents the operation of the platen and feeding mechanism upon the entering of all transactions, in the second position of the slide it prevents the operation of the platen and feeding mechanism when certain transactions are entered and permits the operation of said platen and feeding mechanism when other transactions are entered, and in the third position of the slide it permits the operation of the platen and feeding mechanism upon the entering of all transactions.

31. In a machine of the class described, the combination with a cash drawer, of a frame therefor in which the cash drawer is adapted to slide; a slide carried by the frame for supporting the drawer in open position adapted to be projected from the frame by the drawer as the latter is opened, and pin and slot connections for disconnecting the slide from the drawer as the former nears its outermost position to permit further movement of the drawer independent of the slide.

32. In a cash receptacle, the combination with a drawer, a frame therefor, supporting means for the drawer when in open position, projected from the frame by opening movement of the drawer, and means for disconnecting the drawer from the supporting means before the former reaches its open position whereby opening movement of the drawer independent of the supporting means is effected.

In testimony whereof I affix my signature in the presence of two witnesses.

THOMAS CARROLL.

Witnesses:
R. C. GLASS,
CARL W. BEUST.